US009582387B2

(12) United States Patent　　(10) Patent No.: US 9,582,387 B2
Egami et al.　　(45) Date of Patent: Feb. 28, 2017

(54) SERVER, BACKUP SYSTEM AND BACKUP METHOD

(71) Applicant: NEC Corporation, Minato-ku, Tokyo (JP)

(72) Inventors: Kenichi Egami, Tokyo (JP); Takeshi Chiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 180 days.

(21) Appl. No.: 14/172,456

(22) Filed: Feb. 4, 2014

(65) Prior Publication Data

US 2014/0244589 A1　Aug. 28, 2014

(30) Foreign Application Priority Data

Feb. 25, 2013　(JP) .................................. 2013-034646

(51) Int. Cl.
*G06F 17/30*　(2006.01)
*G06F 11/20*　(2006.01)

(52) U.S. Cl.
CPC ...... *G06F 11/2097* (2013.01); *G06F 11/2038* (2013.01); *G06F 17/30174* (2013.01); *G06F 11/2048* (2013.01)

(58) Field of Classification Search
CPC ........... G06F 17/30073; G06F 11/2038; G06F 11/2048; G06F 11/2097
See application file for complete search history.

(56) References Cited

U.S. PATENT DOCUMENTS

| 5,946,689 A * | 8/1999 | Yanaka | G06F 17/30575 |
| 8,051,333 B2 * | 11/2011 | Kohiga | G06F 11/073 714/42 |
| 8,140,480 B1 * | 3/2012 | Tsaur | G06F 11/1464 707/648 |

(Continued)

FOREIGN PATENT DOCUMENTS

| JP | H05-244653 A | 9/1993 |
| JP | H05-265829 A | 10/1993 |

(Continued)

OTHER PUBLICATIONS

Japanese Office Action for JP Application No. 2013-034646 mailed on Dec. 6, 2016 with English Translation.

*Primary Examiner* — James Trujillo
*Assistant Examiner* — Jessica N Le

(57) ABSTRACT

A server includes: a first data storage device that stores therein data for use in service provided by the server; a backup data storage device that stores therein backup data for data stored in a second data storage device of another server; a service provision unit that provides the service by using the data stored in the first data storage device and by using the backup data stored in the backup data storage device; an update information creation unit that creates update information representing a content of the updating of the first data storage device; an update information transmission unit that transmits the created update information to the another server; and an update information reception unit that receives update information which is transmitted from the another server, and reflects the content of updating of the second data storage device on the backup data stored in the backup data storage device.

8 Claims, 15 Drawing Sheets

(56) References Cited

U.S. PATENT DOCUMENTS

| | | | |
|---|---|---|---|
| 2008/0235336 A1* | 9/2008 | Stern | G06Q 10/107 709/206 |
| 2009/0327805 A1* | 12/2009 | Thiel | G06F 11/1658 714/15 |
| 2011/0153571 A1* | 6/2011 | Walker | G06F 11/1435 707/654 |
| 2012/0221532 A1* | 8/2012 | Watanabe | G06F 17/302 707/687 |
| 2013/0046735 A1* | 2/2013 | Tsuchida | H04L 51/14 707/652 |

FOREIGN PATENT DOCUMENTS

| | | |
|---|---|---|
| JP | H7-66829 A | 3/1995 |
| JP | 2006-259945 A | 9/2006 |
| JP | 2007-274053 A | 10/2007 |

\* cited by examiner

SERVER, BACKUP SYSTEM AND BACKUP METHOD

This application is based upon and claims the benefit of priority from Japanese Patent Application No. 2013-034646, filed on Feb. 25, 2013, the disclosure of which is incorporated herein in its entirety by reference.

TECHNICAL FIELD

The present invention relates to a technology for backing up a server.

BACKGROUND ART

There have been known various technologies each for backing up an apparatus (a server) which provides service to client terminals.

For example, in Japanese Unexamined Patent Application Publication No. Hei 07-66829, there is disclosed a related technology which backs up an e-mail server by multiplexing a plurality of e-mail servers. In this related technology, each of the plurality of e-mail servers has the function of copying and storing therein the contents of mailboxes included in some of the other ones of the plurality of e-mail servers. Further, a client terminal utilizes e-mail service by accessing one of available ones of the plurality of e-mail servers. Further, even when a fault has occurred in an e-mail server among the plurality of e-mail servers, to which a client terminal has been in a state of making an access, the client terminal can continue to utilize the e-mail service by accessing another available one of the plurality of e-mail servers.

Further, for example, in Japanese Unexamined Patent Application Publication No. 2007-274053, there is disclosed a related technology with respect to a method of performing mirroring of mails from an e-mail server to a backup server. In this related technology, when performing a mail addition or deletion process on mailboxes, the e-mail server creates copying information on a mail-by-mail basis with respect to mails targeted for the mail addition or deletion process. Further, the e-mail server transmits the copying information to the backup server. The backup server performs a mail addition or deletion process on mailboxes of the backup server itself on the basis of the received copying information. In this way, in this related technology, the contents of the mailboxes are kept the same between the e-mail server and the backup server. As a result, in this related technology, even when operation has been switched from the e-mail server to the backup server, it is possible to continuously provide client terminals with the e-mail service.

Further, for example, in Japanese Unexamined Patent Application Publication No. 2006-259945, there is disclosed a related technology which backs up a plurality of cards (corresponding to a plurality of servers) mounted on a radio network controller. In this related technology, the radio network controller includes a spare card and a plurality of cards each providing a corresponding one of processes (services) needed for controlling the wireless network. Each of the cards stores self-data therein, and additionally, stores therein backup data for data stored in any other one of the cards. Further, each of the cards is configured to, when the self-data has been changed, transmit copy data resulting from copying the changed self-data to any other one of the cards which stores therein backup data for the self-data, and cause the any other one of the cards to store therein the copy data as the backup data. Further, in this related technology, when a fault has occurred in one of the cards, the radio network controller continues its processing by copying backup data for data of the faulty card from one of the cards which stores the backup data therein to the spare card, and using this spare card as substitute for the faulty card.

SUMMARY

An exemplary object of the present invention is to provide a technology which makes it possible to increase the availability of a system and, simultaneously therewith, further effectively leverage a server for backup.

A server according to an exemplary aspect of the present invention includes a first data storage device that stores therein data for use in service provided by the server; a backup data storage device that stores therein backup data for data stored in a second data storage device included in another server; a service provision unit that provides the service by using the data stored in the first data storage device, and in response to a request from a client terminal utilizing service provided by the another server, provides the client terminal with the service by using the backup data stored in the backup data storage device; an update information creation unit that, when a content of the first data storage device is updated by the service provision unit, creates update information representing a content of the updating having been performed on the content of the first data storage device; an update information transmission unit that transmits the created update information to the another server; and an update information reception unit that receives update information which is transmitted from the another server and which represents a content of updating having been performed on a content of the second data storage device, and reflects the content of the updating having been performed on the content of the second data storage device on the backup data stored in the backup data storage device on the basis of the received update information.

Further, a backup system according to an exemplary aspect of the present invention includes a plurality of the servers each according to the above exemplary aspect of the present invention.

Further, a backup method according to an exemplary aspect of the present invention is a backup method for a server including a first data storage device that stores therein data for use in service provided by the server, and a backup data storage device that stores therein backup data for data stored in a second data storage device included in another server, and includes providing service by using the data stored in the first data storage device; when a content of the first data storage device is updated in conjunction with the provision of the service, creating update information representing a content of the updating having been performed on the content of the first data storage device; transmitting the created update information to the another server; when receiving update information which is transmitted from the another server and which represents a content of updating having been performed on a content of the second data storage device, reflecting the content of the updating having been performed on the content of the second data storage device on the backup data stored in the backup data storage device on the basis of the received update information; and in response to a request from a client terminal utilizing service provided by the another server, providing the client terminal with the service by using the backup data stored in the backup data storage device.

Further, a server according to an exemplary aspect of the present invention includes a first data storage means for storing therein data for use in service provided by the server, a backup data storage means for storing therein backup data for data stored in a second data storage means included in another server, a service provision means for providing the service by using the data stored in the first data storage means, and in response to a request from a client terminal utilizing service provided by the another server, provides the client terminal with the service by using the backup data stored in the backup data storage means, an update information creation means, when a content of the first data storage means is updated by the service provision means, for creating update information representing a content of the updating having been performed on the content of the first data storage means, an update information transmission means for transmitting the created update information to the another server, and an update information reception means for receiving update information which is transmitted from the another server and which represents a content of updating having been performed on a content of the second data storage means, and reflects the content of the updating having been performed on the content of the second data storage means on the backup data stored in the backup data storage means on the basis of the received update information.

BRIEF DESCRIPTION OF THE DRAWINGS

Exemplary features and advantages of the present invention will become apparent from the following detailed description when taken with the accompanying drawings in which.

EXEMPLARY EMBODIMENT

Hereinafter, exemplary embodiments according to the present invention will be described in detail with reference to the drawings.

(First Exemplary Embodiment)

Figure 1:
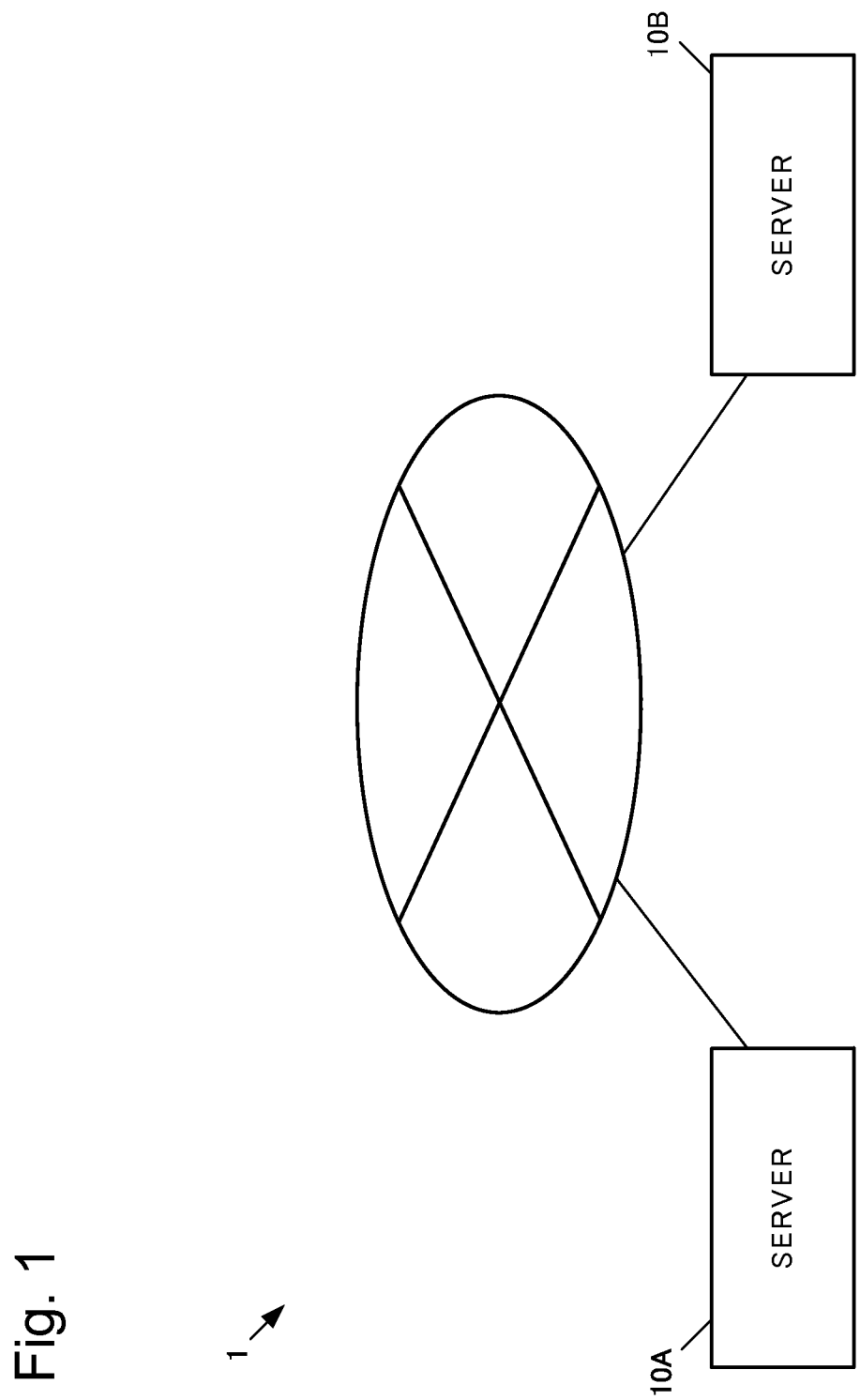
FIG. 1 is a block diagram illustrating an example of the configuration of a backup system according to a first exemplary embodiment of the present invention.

An example of the configuration of a backup system 1 according to a first exemplary embodiment of the present invention is illustrated in FIG. 1. In FIG. 1, the backup system 1 includes servers 10A and 10B. Hereinafter, each of the servers 10A and 10B will be also collectively referred to as a server 10. The servers 10 are mutually communicably connected to each other via a network, such as the internet, a local area network (LAN), a public line network, a wireless communication network or a network resulting from combining any two or more of these networks and the like. In addition, although the number of the servers 10 illustrated in FIG. 1 is two, the number of servers included in the backup system 1 according to this first exemplary embodiment of the present invention is not limited to this.

Figure 2:
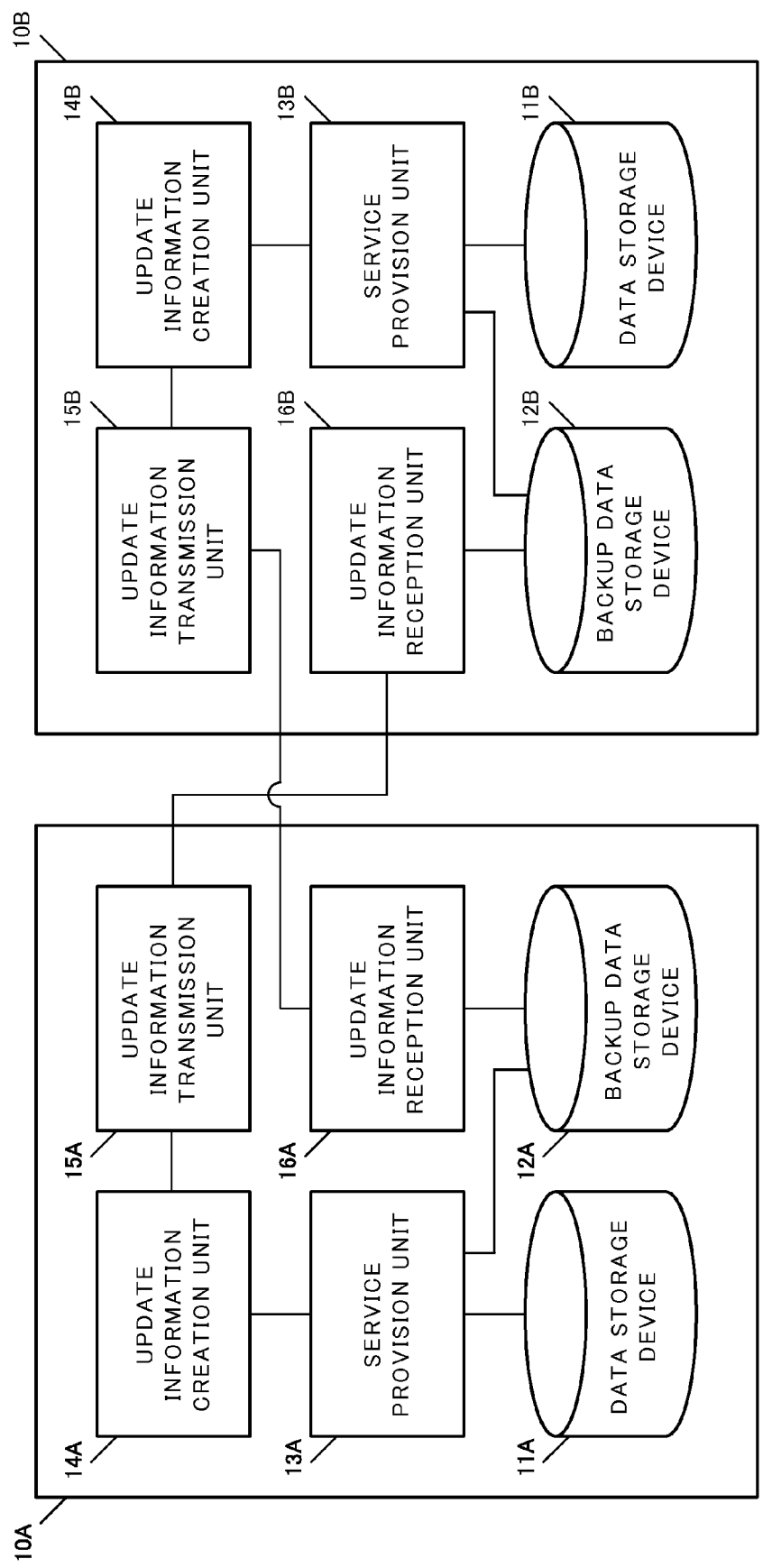
FIG. 2 is a functional block diagram illustrating an example of the functional configuration of a server in the backup system according to the first exemplary embodiment of the present invention.

Next, an example of the functional configuration of the server 10 is illustrated in FIG. 2. In FIG. 2, the server 10A includes a data storage device 11A, a backup data storage device 12A, a service provision unit 13A, an update information creation unit 14A, an update information transmission unit 15A and an update information reception unit 16A. Further, the server 10B includes a data storage device 11B, a backup data storage device 12B, a service provision unit 13B, an update information creation unit 14B, an update information transmission unit 15B and an update information reception unit 16B. Hereinafter, each of the data storage devices 11A and 11B will be also collectively referred to a data storage device 11. Further, each of the backup data storage devices 12A and 12B will be also collectively referred to a backup data storage device 12. Further, each of the service provision units 13A and 13B will be also collectively referred to as a service provision unit 13. Further, each of the update information creation units 14A and 14B will be also collectively referred to as an update information creation unit 14. Further, each of the update information transmission units 15A and 15B will be also collectively referred to as an update information transmission unit 15. Further, each of the update information reception units 16A and 16B will be also collectively referred to as an update information reception unit 16.

Figure 3:
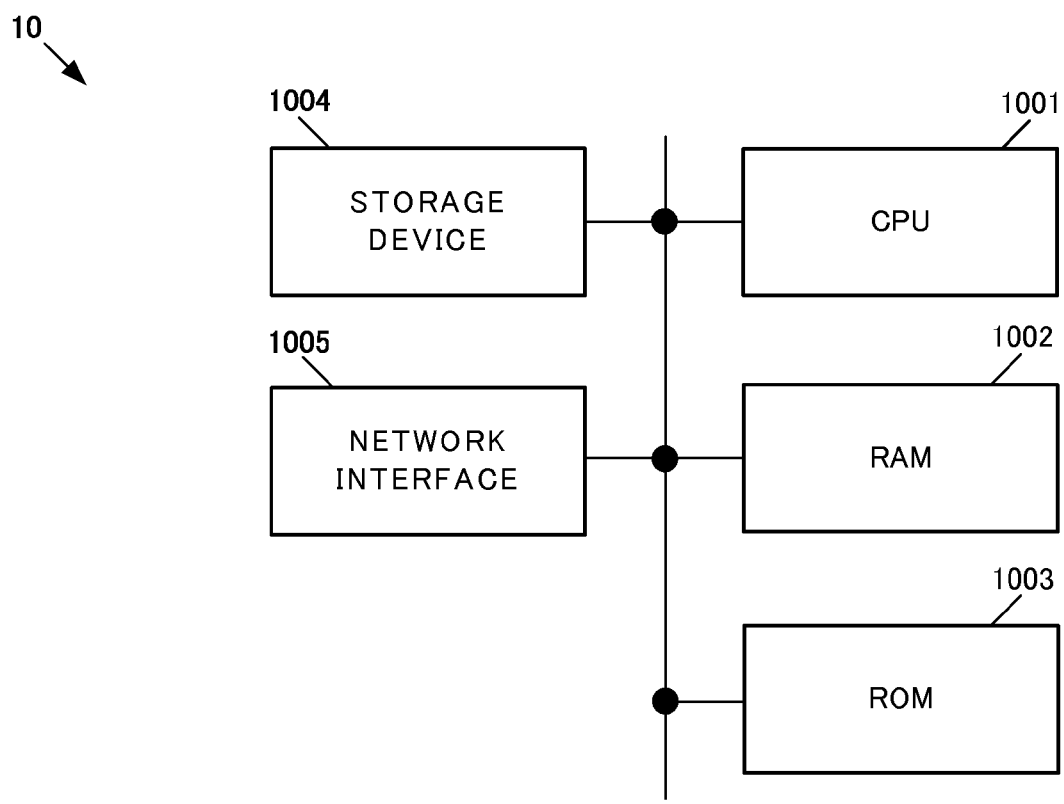
FIG. 3 is a hardware configuration diagram illustrating an example of the hardware configuration of a server in the backup system according to the first exemplary embodiment of the present invention.

Here, an example of the hardware configuration of the server 10 is illustrated in FIG. 3. As shown in FIG. 3, the server 10 can be realized by a computer apparatus provided with a central processing unit (CPU) 1001, a random access memory (RAM) 1002, a read only memory (ROM) 1003, a storage device 1004, such as a hard disk, and a network interface 1005. In this case, the data storage device 11 and the backup data storage device 12 are each realized by the storage device 1004. Further, the service provision unit 13 and the update information creation unit 14 are each realized by the CPU 1001 which reads a computer program and various pieces of data stored in the ROM 1003 and the storage device 1004 into the RAM 1002 and executes the computer program. Further, the update information transmission unit 15 and the update information reception unit 16 are each realized by a network interface 1005 as well as the CPU 1001 which reads the computer programs and the various pieces of data stored in the ROM 1003 and the storage device 1004 into the RAM 1002 and executes the computer program. In addition, a hardware configuration constituting the server 10 and the individual function blocks thereof is not limited to the aforementioned configuration.

Next, details of each of the function blocks of the server 10 will be described.

The data storage device 11 of each of the servers 10 stores therein data for use in service provided by the each server 10.

The backup data storage device 12 of each of the servers 10 stores therein backup data for data stored in the data storage device 11 of the other one of the servers 10.

That is, in this exemplary embodiment, the backup data storage device 12A stores therein backup data for data stored in the data storage device 11B of the server 10B. Further, the backup data storage device 12B stores therein backup data for data stored in the data storage device 11A of the server 10A.

The service provision unit 13 of each of the servers 10 provides service by using the data stored in the data storage device 11. Further, in response to a request from a client terminal utilizing service provided by the other one of the servers 10, the service provision unit 13 of each of the servers 10 provides the service to the client terminal by using the backup data stored in the backup data storage device 12 of the each server 10.

The update information creation unit 14 of each of the servers 10 is configured to, when the content of the data stored in the data storage device 11 has been updated by the service provision unit 13, create update information. Here, the update information is information representing the content of the updating having been performed on the data stored in the data storage device 11 of the each server 10. For example, when data has been added into the data storage device 11, the update information may be one including a piece of information representing that a relevant update process is an addition process, as well as pieces of information each representing a corresponding one of a position where the data has been added, and the body of the added data. Further, when part of the data stored in the data storage device 11 has been deleted, the update information may be one including a piece of information representing that a relevant update process is a deletion process as well as a piece of information representing a deletion range. In this way, the update information is preferred to be of a size smaller than that of the entire data stored in the data storage device 11.

The update information transmission unit 15 of each of the servers 10 transmits the update information, which has been created by the update information creation unit 14, to the other one of the servers 10.

Here, the service provision unit 13 and the update information creation unit 14 may be configured so as to operate in the same process. Further, the update information transmission unit 15 may be configured so as to operate in a process different from the process for the service provision unit 13 and the update information creation unit 14. In this case, the update information creation unit 14 stores and accumulates the update information in a predetermined storage area of the storage device 1004. Further, processing may be performed such that, when having detected that the pieces of update information have been accumulated in the predetermined storage area, the update information transmission unit 15 serially transmits the accumulated pieces of update information, and serially deletes transmission-completed pieces of update information among the accumulated pieces of update information.

The update information reception unit 16 of each of the servers 10 receives update information from the other one of the servers 10 and reflects the update information in the backup data storage device 12. The update information from the other server 10 is information representing the content of updating having been performed on data stored in the data storage device 11 of the other server 10. For example, when having received update information including a piece of information which, as described above, represents that a relevant update process is a data addition process, the update information reception unit 16 adds data into the backup data storage device 12 in accordance with the received update information. Further, for example, when having received update information including a piece of information which, as described above, represents that a relevant update process is a data deletion process, the update information reception unit 16 deletes data falling within a designated range from the data stored in the backup data storage device 12 in accordance with the received update information.

Hereinafter, operation of the backup system 1 configured in such a way as described above will be described with reference to some of the drawings.

Figure 4:
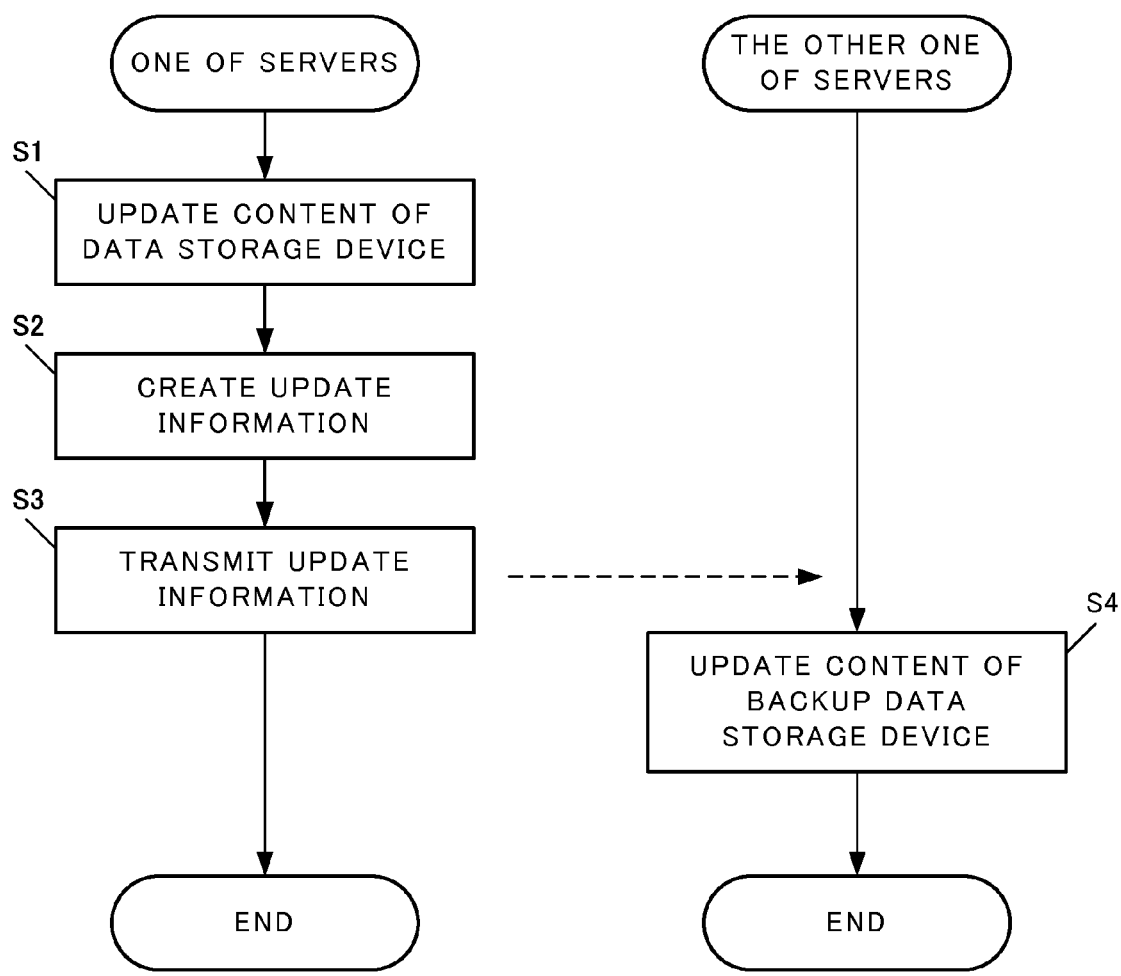
FIG. 4 is a flowchart illustrating an example of backup operation in the backup system according to the first exemplary embodiment of the present invention.

First, backup operation of the backup system 1 is illustrated in FIG. 4. Here, operation of backing up data of the server 10A into the server 10B will be described. In addition, in FIG. 4, a left-hand portion illustrates operation of the server 10A; while a right-hand portion illustrates operation of the server 10B, and a dashed line having an arrow and connecting between the left-hand portion and the right-hand portion illustrates a flow of data.

As shown in FIG. 4, first, in the server 10A, the service provision unit 13A updates the content of data stored in the data storage device 11A in conjunction with provision of service to a client terminal by the server 10A (Step S1).

Next, the update information creation unit 14A creates update information representing the content of the updating having been performed on the data stored in the data storage device 11A (Step S2).

Next, the update information transmission unit 15A transmits the update information having been created in Step S2 to the server 10B (Step S3).

Next, in the server 10B, the update information reception unit 16B receives the update information which has been transmitted from the server 10A in Step S3, and updates backup data stored in the backup data storage device 12B by reflecting the received update information on the backup data stored in the backup data storage device 12B (Step S4).

With the above operation, the backup system 1 terminates the backup operation.

Figure 5:
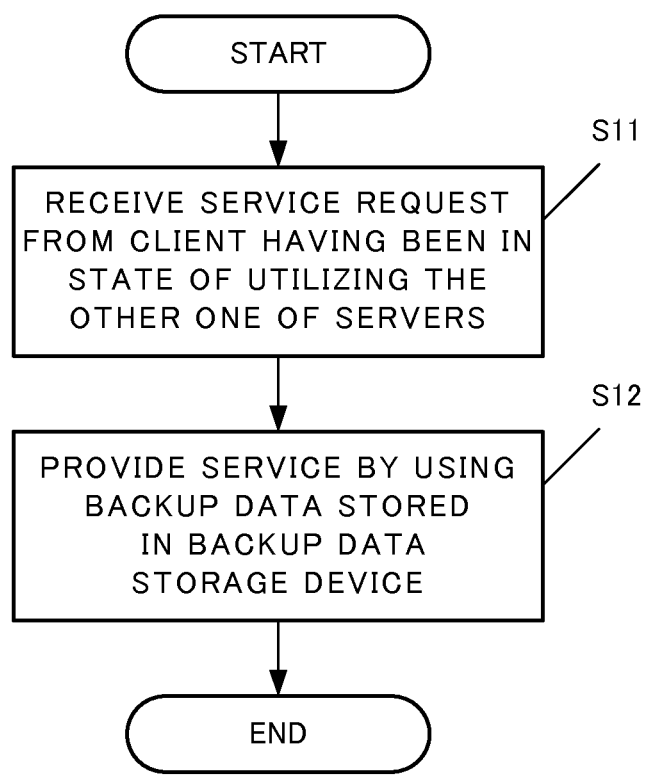
FIG. 5 is a flowchart illustrating an example of service continuation operation in the backup system according to the first exemplary embodiment of the present invention.

Next, service continuation operation of the backup system 1 at the time of suspension of service provided by the server 10A is illustrated in FIG. 5. For example, the server 10A suspends service provision when a fault has occurred in the server 10A, or when operation of the server 10A needs to be temporarily suspended because of maintenance of the server 10A or the like.

At this time, it is supposed that, in a client terminal which has been in a state of utilizing service provided by the server 10A, a destination of a service request is switched so that its service request can be made to the server 10B as substitute for the server 10A. Such an operation of switching a service request destination may be automatically performed by a client terminal which has detected the suspension of service provided by the server 10A. Alternatively, such an operation of switching a service request destination may be manually set onto a client terminal by its user who has recognized the suspension of service provided by the server 10A. Alternatively, the server 10A may transfer a service request having been made to the server 10A itself to the server 10B. Besides, publicly known technologies can be applied to such an operation of switching a service request destination at the time of suspension of service provision.

As shown in FIG. 5, first, in the server 10B, the service provision unit 13B receives a service request from a client terminal which has been in a state of utilizing service provided by the server 10A until then (Step S11).

Next, the service provision unit 13B provides the requested service to the client terminal by using the backup data stored in the backup data storage device 12B (Step S12).

The above is the description of the service continuation operation of the backup system 1.

In addition, in the above-described some kinds of operation of the backup system 1, the server 10A and the function blocks thereof may be deemed as the server 10B and the function blocks thereof, respectively, and the server 10B and the function blocks thereof may be deemed as the server 10A and the function blocks thereof, respectively. In this way, operation of backing up data stored in the server 10B into the server 10A as well as continuation operation at the time of suspension of service provided by the server 10B can be similarly described.

Next, advantageous effects of the first exemplary embodiment according to the present invention will be described.

The backup system as the first exemplary embodiment according to the present invention makes it possible to increase the availability of a system and, simultaneously therewith, further effectively leverage a server for backup.

A reason for this is that the data storage device of each of servers stores therein data for use in service provided by the each server, and the backup data storage device of the each server stores therein backup data for data stored in the data storage device of another one of the servers. Further, a reason is that the service provision unit of the each server provides service by using the data stored in the data storage device of the each server, and further, in response to a service request from a client terminal which has been in a state of utilizing service provided by the another server, the service provision unit of the each server provides the service by using the backup data stored in the backup data storage device of the each server. Moreover, a reason is that the update information creation unit of each of the servers creates update information representing a content of updating having been performed on the data stored in the data storage device of the each server; the update information transmission unit of each of the servers transmits the created update information to another one of the servers; the update information reception unit of each of the servers receives update information from another one of the servers, and reflects the update information on the backup data stored in the backup data storage device of the each server.

In this way, each of servers can operate as a backup server for another one of the servers and, simultaneously therewith, the each of the servers can provide service by itself independently of the another one of the servers. Accordingly, in this exemplary embodiment, it is possible to, during normal operation of one of servers, prevent another one of the servers, which operates as a backup server for the one of the servers, from transiting to a waiting state, so that it is possible to further effectively leverage each of the servers.

Further, in the backup system as the first exemplary embodiment according to the present invention, backup operation does not cause any delay of service provision operation.

A reason for this is that the update information creation unit creates and accumulates the piece of update information, and the update information transmission unit detects the accumulation of the piece of update information and serially transmits the accumulated pieces of update information. This configuration can be realized by making a configuration such that the update information transmission unit operates in a process different from a process in which the service provision unit and the update information creation unit operate. In this way, in the backup system according to this exemplary embodiment, processing for transmitting the update information for use in backup processing gives no influence on service provision processing.

(Second Exemplary Embodiment)

Next, a second exemplary embodiment according to the present invention will be described in detail with reference to some of the drawings. In this exemplary embodiment, an example in which an e-mail server is given as the server according to the first aspect of the present invention will be described. In addition, in each of drawings referred to in description of this exemplary embodiment, a component identical to that of the first exemplary embodiment and a step whose operation is performed similarly to that of one of the steps in the first exemplary embodiment are each denoted by the same reference sign, and detailed description thereof will be omitted in this exemplary embodiment.

Figure 6:
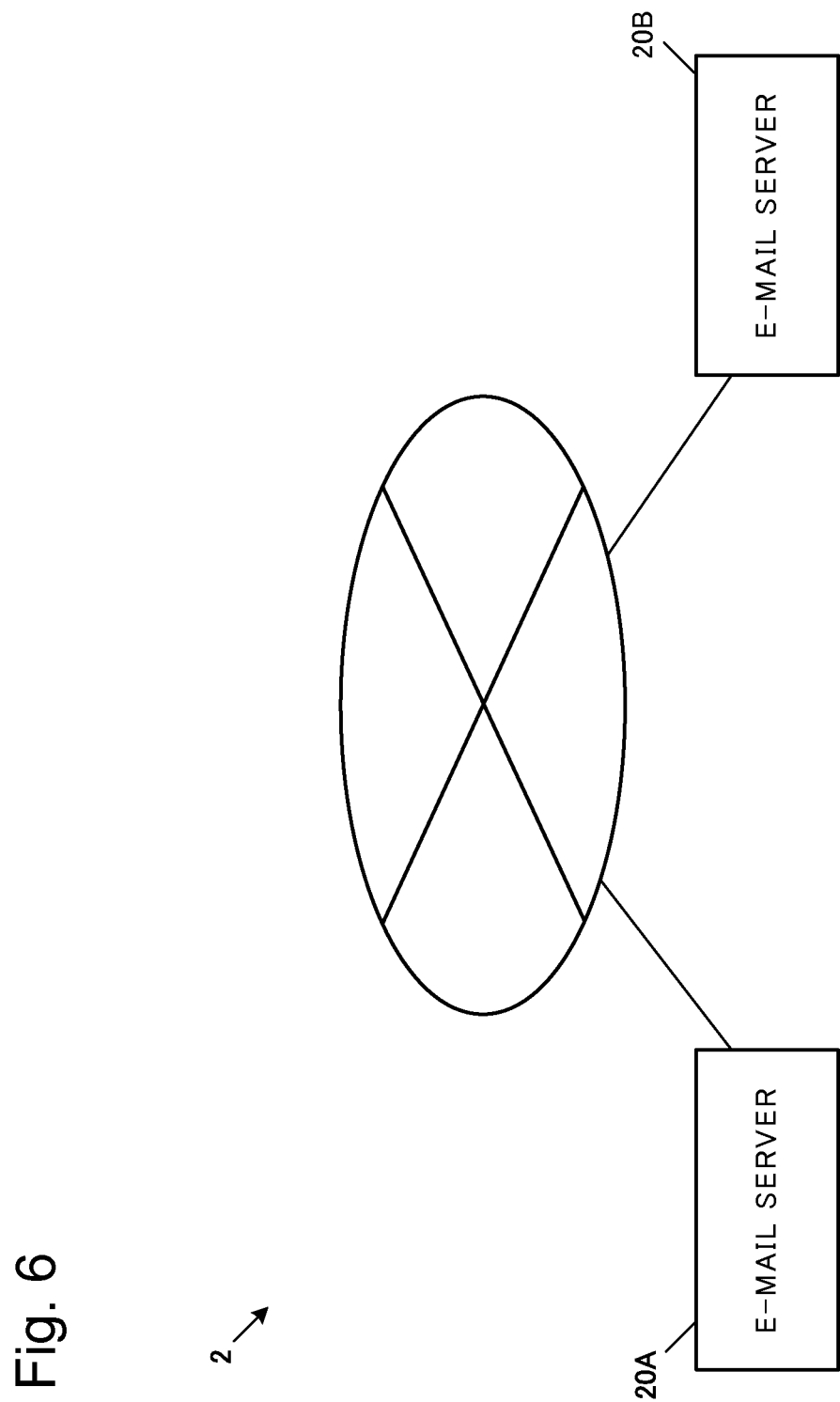
FIG. 6 is a block diagram illustrating an example of the configuration of a backup system according to a second exemplary embodiment of the present invention.

First, an example of the configuration of a backup system 2 as the second exemplary embodiment according to the present invention is illustrated in FIG. 6. In FIG. 6, the backup system 2 includes e-mail servers 20A and 20B. Hereinafter, each of the e-mail servers 20A and 20B will be also collectively referred to as an e-mail server 20. The e-mail servers 20 are mutually communicably connected to each other via a network, such as the internet, a LAN, a public line network, a wireless communication network or a network resulting from combining any two or more of these networks and the like. In addition, although the number of the e-mail server 20 illustrated in FIG. 6 is two, the number of the e-mail servers included in the backup system 2 according to this second exemplary embodiment of the present invention is not limited to this.

Figure 7:
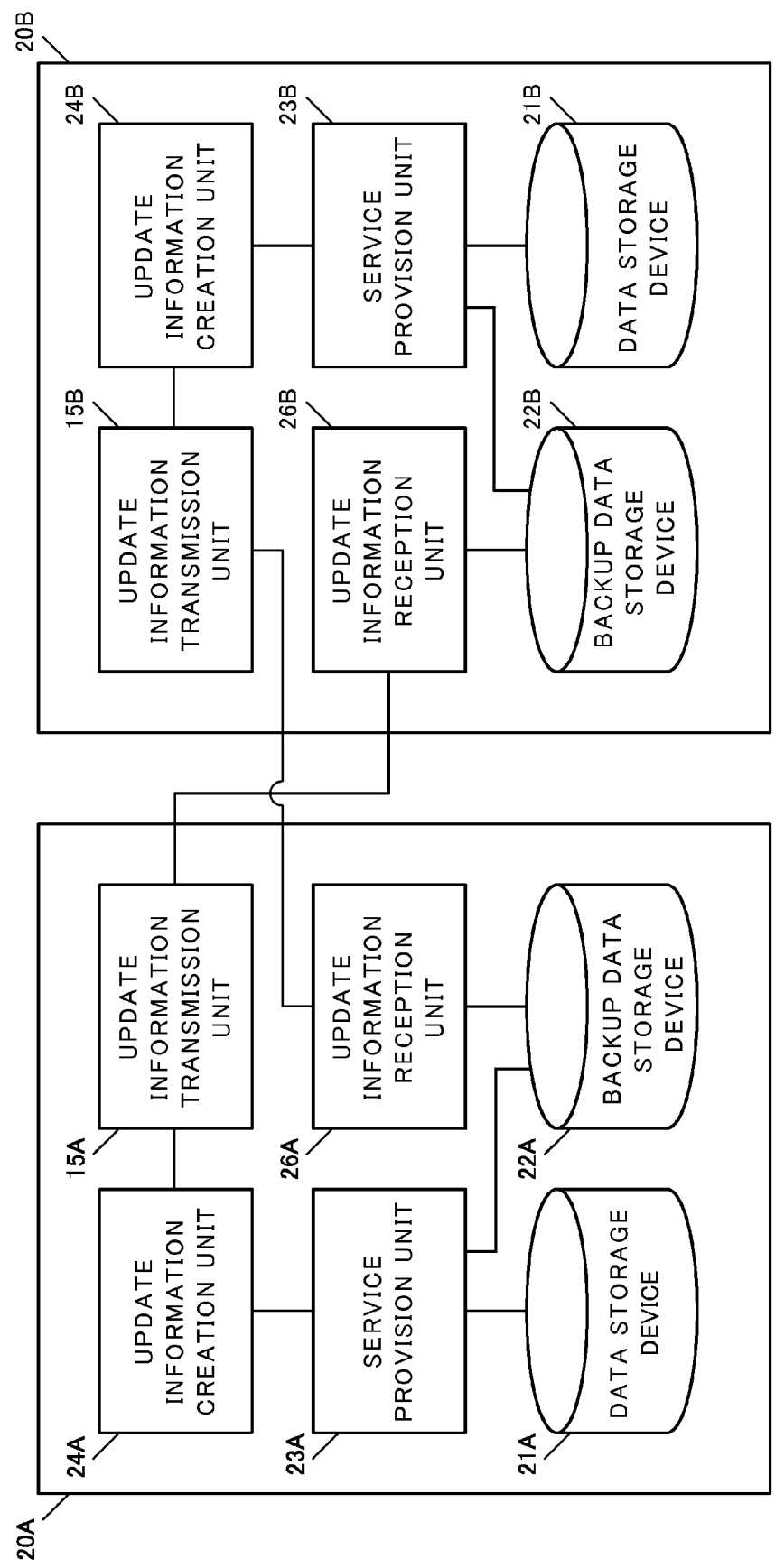
FIG. 7 is a functional block diagram illustrating an example of the functional configuration of an e-mail server in the backup system according to the second exemplary embodiment of the present invention.

Next, an example of the functional configuration of the e-mail server 20 is illustrated in FIG. 7. In FIG. 7, the e-mail server 20 is different from the server 10 as the first exemplary embodiment according to the present invention in that the e-mail server 20 includes a data storage device 21 as substitute for the data storage device 11, a backup data storage device 22 as substitute for the backup data storage device 12, a service provision unit 23 as substitute for the service provision unit 13, an update information creation unit 24 as substitute for the update information creation unit 14, and an update information reception unit 26 as substitute for the update information reception unit 16.

Here, a hardware configuration constituting the e-mail server 20 and the individual function blocks thereof can be realized by the same hardware configuration as that constituting the server 10 and the individual function blocks thereof, according to the first exemplary embodiment of the present invention and having been described with reference to FIG. 3. In addition, the hardware configuration constituting the e-mail server 20 and the individual function blocks thereof is not limited to the aforementioned configuration.

Next, details of each of the function blocks of the e-mail server 20 will be described.

The data storage device 21 of each of the e-mail servers 20 stores therein mail data for use in e-mail service provided by the each e-mail server 20. Specifically, the data storage device 21 stores the mail data in a mailbox for each of user accounts registered in the each e-mail server 20.

The backup data storage device 22 of each of the e-mail servers 20 stores therein backup data for mail data stored in the data storage device 21 of the other one of the e-mail servers 20. Here, the data storage device 21 of the other e-mail server 20 stores mail data in a mailbox for each of user accounts registered in the other e-mail server 20. Thus, as a result, the backup data storage device 22 of the each e-mail server 20 is provided therein with a mailbox for each of user accounts registered in the other e-mail server 20, and stores backup data for the mail data stored in the other e-mail server 20 in this mailbox.

That is, in this exemplary embodiment, the backup data storage device 22A stores therein backup data for mail data stored in the data storage device 21B of the e-mail server 20B. Further, the backup data storage device 22B stores therein backup data for mail data stored in the data storage device 21A of the e-mail server 20A.

The service provision unit 23 of each of the e-mail server 20 provides e-mail service by using the mail data stored in the data storage device 21. Further, in response to a request from a client terminal utilizing e-mail service provided by the other one of the e-mail servers 20, the service provision unit 23 of each of the e-mail servers 20 provides the e-mail service to the client terminal by using backup data stored in the backup data storage device 22 of the each e-mail server 20. At this time, in the e-mail service using the backup data storage device 22, it is preferred for the service provision unit 23 to cause the backup data to be in a read-only mode.

For example, the service provision unit 23 may provide mail transfer service based on simple mail transfer protocol (SMTP). In this case, specifically, the service provision unit 23 receives mail data from an external e-mail server or a client terminal. Further, the service provision unit 23 of each of the e-mail servers 20 is configured to, when the destination of the received mail data corresponds to a user account managed by the each e-mail server 20, add the mail data into the mailbox which is included in the data storage device 21 of the each e-mail server 20 and which is associated with the user account. Further, the service provision unit 23 of the each e-mail server 20 is configured to, when the destination of the received mail data does not correspond to the user account managed by the each e-mail server 20, transmit the mail data to an external e-mail server. Further, the service provision unit 23 causes the backup data to be in a read-only mode. Further, the service provision unit 23 does not perform any service for receiving mail data and adding it into the backup data storage device 22.

Further, for example, the service provision unit 23 may provide mail acquisition service based on post office protocol (POP). Specifically, in response to reception of a POP command from a client terminal, the service provision unit 23 carries out mail operation processing on mail data stored in the data storage device 21. The mail operation processing includes mail acquisition processing which does not involve any process of updating the data storage device 21, mail deletion processing which involves a process of updating the data storage device 21 and the like. For example, when having received a DELE command, the service provision unit 23 gives a deletion flag to a relevant piece of mail data, and when having received a QUIT command, the service provision unit 23 deletes pieces of mail data each having been given the deletion flag.

Further, in each of the e-mail servers 20, when the service provision unit 23 has received a POP command from a client terminal which has been in a state of utilizing e-mail service provided by the other one of the e-mail servers 20 until then, the service provision unit 23 carries out mail operation processing on backup data stored in the backup data storage device 22. At this time, the service provision unit 23 causes the backup data stored in the backup data storage device 22 to be in a read-only mode. That is, the service provision unit 23 is configured so as to accept any POP command for processing which does not involve any update process, such as a mail acquisition process, and so as not to accept any POP command for processing which involves an update process, such as a mail deletion process.

When mail data stored in the data storage device 21 has been updated, the update information creation unit 24 creates update information.

For example, when a piece of mail data has been added into the data storage device 21 by the service provision unit 23, the update information creation unit 24 creates update information representing the mail addition. The update information representing a mail addition may be information including a piece of information representing that a relevant update process is a mail addition process, as well as pieces of information each representing a corresponding one of a mail box associated with a relevant user account; a unique identifier (UID) which is a piece of identification information associated with a relevant mail; and a mail body.

Further, for example, when mail operation processing involving a process of updating mail data stored in the data storage device 21 has been performed by the service provision unit 23, the update information creation unit 24 creates update information representing the mail operation. The update information representing a mail operation may be information including pieces of information each representing a corresponding one of the content of a mail operation; a mailbox associated with a relevant user account; and a UID of a mail targeted for the mail operation. For example, in the case of the POP, the update information creation unit 24 may create the update information representing a mail deletion at timing when a QUIT command has been received by the service provision unit 23.

The update information reception unit 26 of each of the e-mail servers 20 receives update information from the other one of the e-mail servers 20, and reflects the update information in the backup data storage device 22. The update information from the other e-mail server 20 is information representing the content of updating having been performed on mail data stored in the data storage device 21 of the other e-mail server 20.

For example, when having received update information representing the above mail addition, the update information reception unit 26 adds mail data, the content of which is included in the update information, into a mail box which is included in the backup data storage device 22 and which is associated with a user account indicated by the update information, simultaneously with associating the mail data with a UID indicated by the update information. Further, when having received update information representing the above mail operation (for example, a mail deletion), the update information reception unit 26 carries out a relevant mail operation (for example, a mail deletion) with respect to a mail which corresponds to the UID indicated by the update information and which is stored in a mail box being included in the backup data storage device 22 and being associated with a user account indicated by the update information.

Hereinafter, operation of the backup system 2 configured in such a way as described above will be described with reference to some of the drawings.

Figure 8:
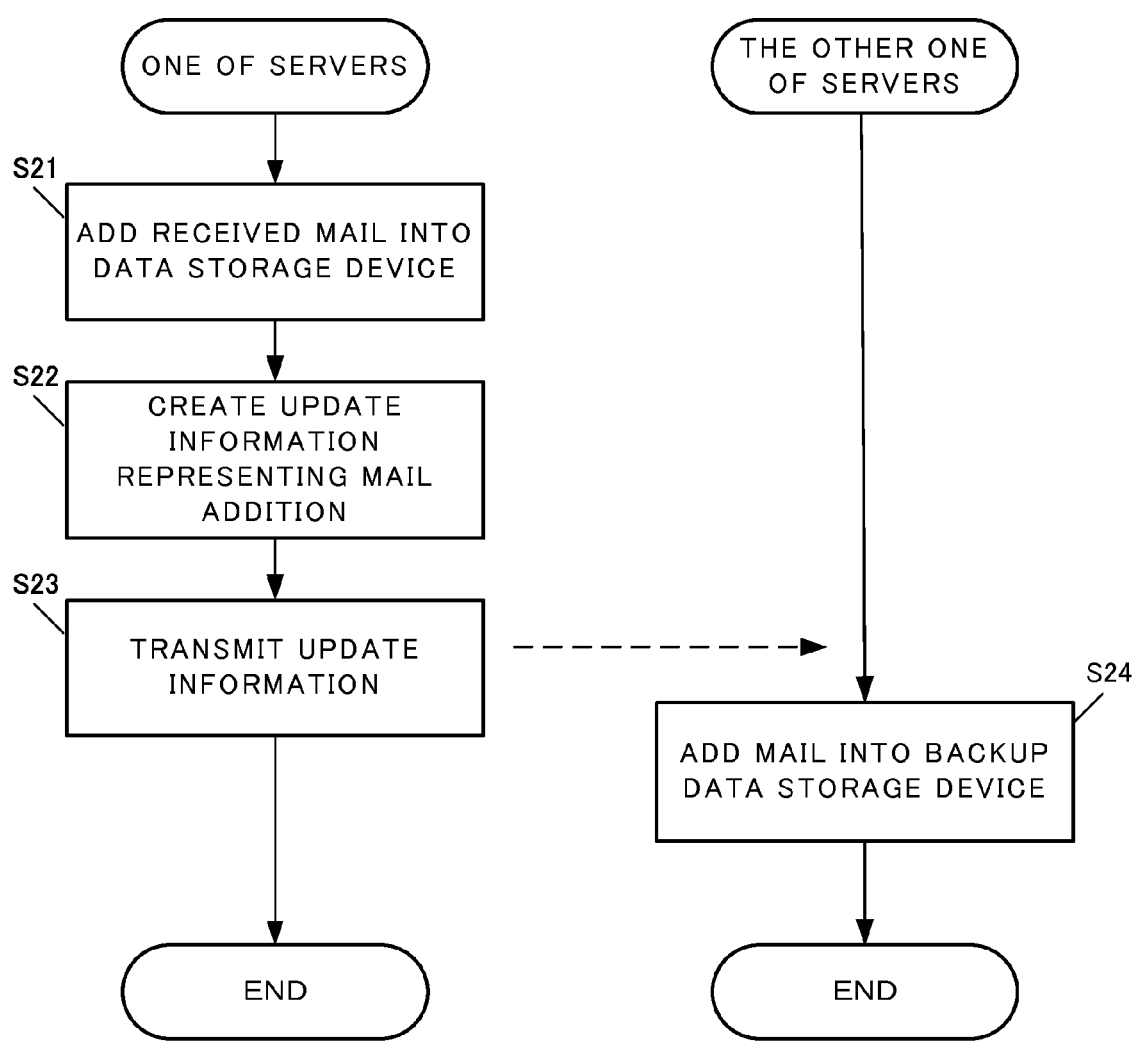
FIG. 8 is a flowchart illustrating an example of backup operation when a new mail is received, in the backup system according to the second exemplary embodiment of the present invention.

First, backup operation of the backup system 2 when a new mail has been received in the e-mail server 20A is illustrated in FIG. 8. In addition, in FIG. 8, a left-hand portion illustrates operation of the e-mail server 20A; while a right-hand portion illustrates operation of the e-mail server 20B, and a dashed line having an arrow and connecting between the left-hand portion and the right-hand portion illustrates a flow of data.

As shown in FIG. 8, first, in the e-mail server 20A, the service provision unit 23A receives a mail from an external e-mail server or a client terminal. Further, when the destination of the received mail corresponds to a user account registered in the e-mail server 20A, the service provision unit 23A adds the received mail into a mailbox which is included in the data storage device 21A and which is associated with the relevant user account (Step S21).

Next, the update information creation unit 24A creates update information related to the added mail (Step S22). For example, as described above, the update information creation unit 24A may update information including a piece of information representing that a relevant update process is a mail addition process, as well as pieces of information each representing a corresponding one of a mail box associated with a relevant user account; a UID; and a mail body.

Next, the update information transmission unit 15A transmits the update information having been created in Step S22 to the e-mail server 20B (Step S23).

Next, in the e-mail server 20B, the update information reception unit 26B receives the update information having been transmitted from the e-mail server 20A in Step S23, and updates backup data stored in the backup data storage device 22B by reflecting the received update information in the backup data storage device 22B (Step S24). Specifically, the update information reception unit 26B adds mail data, the content of which is included in the update information, into a mailbox which is included in the backup data storage device 22B and which is associated with a user account indicated by the update information, simultaneously with associating the mail data with the UID indicated by the update information.

With the above operation, the backup system 2 terminates the backup operation when the new mail has been received in the e-mail server 20A.

Figure 9:
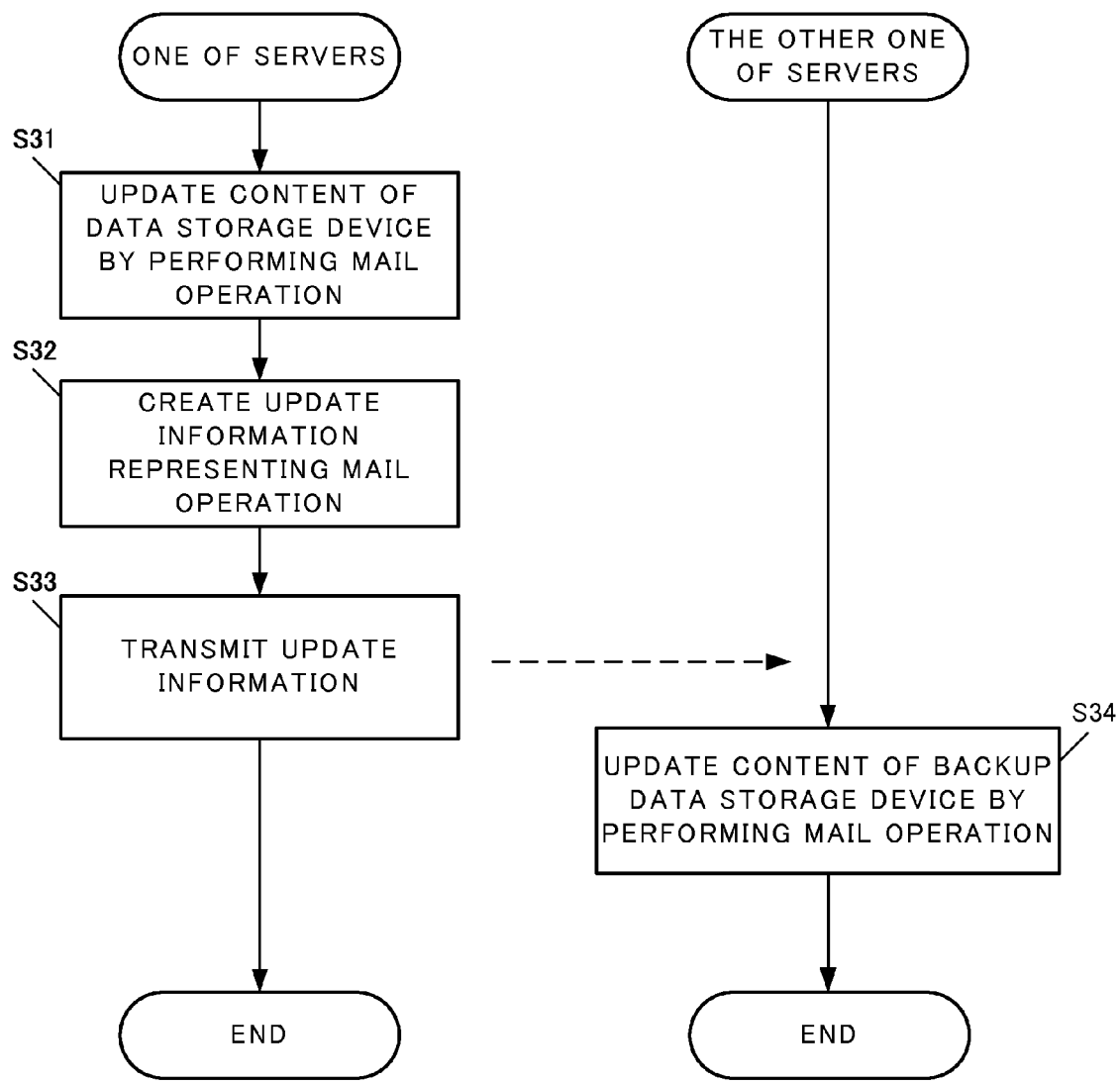
FIG. 9 is a flowchart illustrating an example of backup operation when a mail operation involving an update process is carried out, in the backup system according to the second exemplary embodiment of the present invention.

Next, backup operation of the backup system 2 when a mail operation involving an update process has been carried out in the e-mail server 20A is illustrated in FIG. 9.

As shown in FIG. 9, first, in the e-mail server 20A, the service provision unit 23A carries out a mail operation involving an update process with respect to mail data stored in the data storage device 21A on the basis of a request from a client terminal (Step S31). For example, as described above, upon every receipt of a DELE command from a client terminal, the service provision unit 23A gives a deletion flag to a piece of target mail data, and in response to reception of a QUIT command, the service provision unit 23A deletes pieces of mail data each having been given the deletion flag.

Next, the update information creation unit 24A creates update information representing the mail operation having been performed in Step S31 (Step S32). For example, as described above, as update information representing a mail deletion, the update information creation unit 24A may create update information including a piece of information representing that the content of a mail operation is the mail deletion, as well as pieces of information each representing a corresponding one of a mailbox associated with a relevant user account and a UID of a mail targeted for deletion.

Next, the update information transmission unit 15A transmits the update information having been created in Step S32 to the e-mail server 20B (Step S33).

Next, in the e-mail server 20B, the update information reception unit 26B receives the update information having been transmitted from the e-mail server 20A in Step S33. For example, the update information reception unit 26B updates backup data by carrying out a mail operation indicated by the above update information with respect to mail data stored in the backup data storage device 22B (Step S34). For example, when the received update information indicates a mail deletion, in the backup data storage device 22B, the update information reception unit 26B deletes a piece of mail data corresponding to the UID indicated by the update information inside the mailbox associated with the user account indicated by the update information.

With the above operation, the backup system 2 terminates the backup operation when a mail operation involving an update process has been carried out in the e-mail server 20A.

Figure 10:
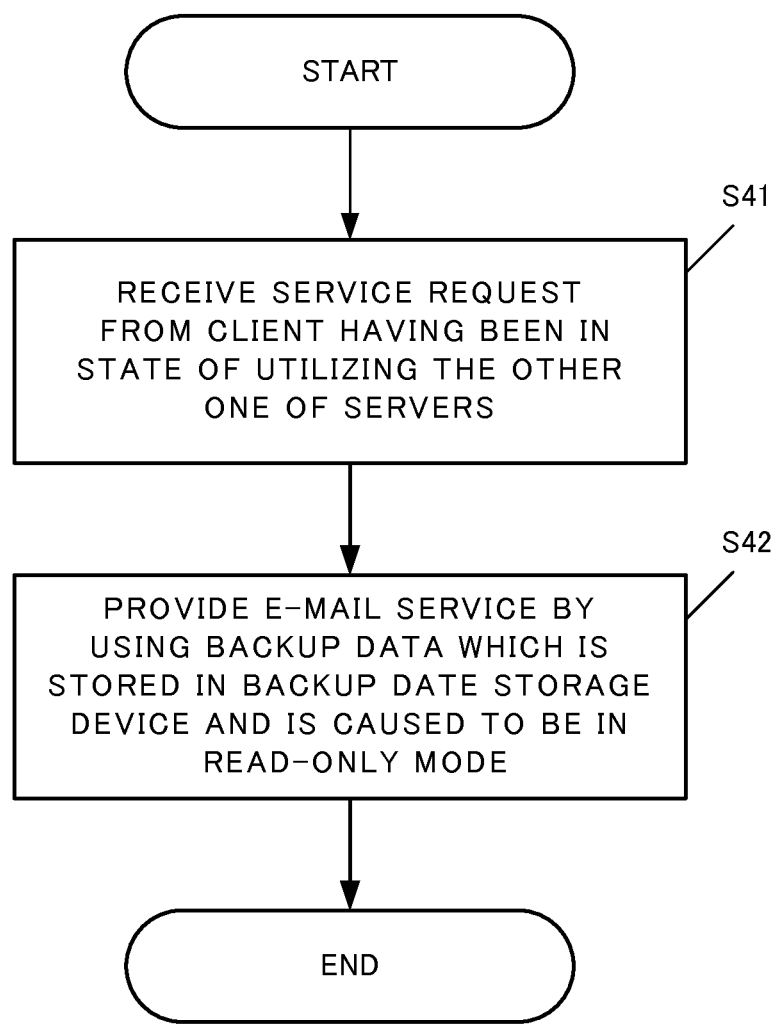
FIG. 10 is a flowchart illustrating an example of service continuation operation in the backup system according to the second exemplary embodiment of the present invention.

Next, a service continuation operation of the backup system 2 when service provision by the e-mail server 20A has been suspended is illustrated in FIG. 10. For example, the server 20A suspends service provision when a fault occurs in the server 20A, or when operation of the server 20A needs to be temporarily suspended because of maintenance of the server 20A or the like.

At this time, it is supposed that, in each of client terminals utilizing the e-mail server 20A, a service request destination is switched so that its service request can be made to the e-mail server 20B as substitute for the e-mail server 20A. Various publicly known technologies can be applied to such switching of a request destination, just like the switching of a request destination in the first exemplary embodiment according to the present invention.

As shown in FIG. 10, first, in the e-mail server 20B, the service provision unit 23B receives a service request from a client terminal which has been in a state of utilizing the e-mail service provided by the e-mail server 20A until then (Step S41). For example, the service provision unit 23B receives a POP command from such a client terminal. In addition, the service provision unit 23B may store therein user accounts managed by the e-mail server 20A as user accounts for backup data. Further, the service provision unit 23B may receive a request for authentication before using such a user account for backup data, and may provide service after having been authenticated.

Next, the service provision unit 23B provides the e-mail service by using the backup data stored in the backup data storage device 22B (Step S42). At this time, the service provision unit 23B causes the backup data to be in a read-only mode. For example, the service provision unit 23B operates so as to accept any POP command which requests an acquisition of backup data, and operates so as not to accept any POP command which requests a deletion of the backup data.

The above is the description of the service continuation operation of the backup system 2.

In addition, in the above-described some kinds of operation of the backup system 2, the e-mail server 20A and the function blocks thereof may be deemed as the e-mail server 20B and the function blocks thereof, respectively, and the e-mail server 20B and the function blocks thereof may be deemed as the e-mail server 20A and the function blocks thereof, respectively. In this way, operation of backing up data stored in the e-mail server 20B into the server 20A as well as continuation operation at the time of suspension of service provided by the server 20B can be similarly described.

Next, advantageous effects of the second exemplary embodiment according to the present invention will be described.

The backup system as the second exemplary embodiment according to the present invention makes it possible to allow one of e-mail servers for backing up another one of the e-mail servers to operate independently of the another e-mail server, so that it is possible to further effectively leverage each of the e-mail servers.

A reason for this is that the data storage device of each of the e-mail serves stores therein mail data used in e-mail service provided by the each of the e-mail servers, and the backup data storage device of the each e-mail server stores therein backup data for mail data used by the another e-mail server. Further, a reason is that the service provision unit of the each e-mail server provides e-mail service by using the mail data stored in the data storage device, and further, when having received a service request from a client terminal which has been in a state of utilizing e-mail service provided by the another e-mail server until then, the service provision unit provides the client terminal with the e-mail service by using the backup data stored in the backup data storage device. Moreover, a reason is that the update information creation unit of the each e-mail server creates update information representing the content of updating having been performed on the mail data used in the each e-mail server; the update information transmission unit of each e-mail server transmits the created update information to the another e-mail server; while the update information reception unit of the each e-mail server receives update information from the another e-mail server, and reflects the received update information in the backup data storage device.

In this way, each of the e-mail servers can operate as a backup server for another one of the e-mail servers, and simultaneously therewith, the each e-mail server can provide service independently of the another e-mail server. Accordingly, in this exemplary embodiment, it is possible to, during normal operation of one of e-mail servers, prevent another one of the e-mail servers, which operates as a backup server for the one of the e-mail servers, from transiting to a waiting state, so that it is possible to further effectively leverage each of the e-mail servers.

Further, in this second exemplary embodiment according to the present invention, it is possible to effectively leverage each of e-mail servers, and simultaneously therewith, maintain the identity of mail data stored in the each of the e-mail servers with backup data therefor stored in another one of the e-mail servers.

A reason for this is that, when providing e-mail service by using the backup data stored in the backup data storage device, the service provision unit of each of the e-mail servers causes the backup data to be in a read-only mode.

(Third Exemplary Embodiment)

Next, third exemplary embodiment according to the present invention will be described in detail with reference to some of the drawings. In addition, in each of drawings referred to in description of this exemplary embodiment, a component identical to that of the second exemplary embodiment and a step whose operation is performed similarly to that of one of the steps in the second exemplary embodiment are each denoted by the same reference sign, and detail description thereof will be omitted in this exemplary embodiment.

Figure 11:
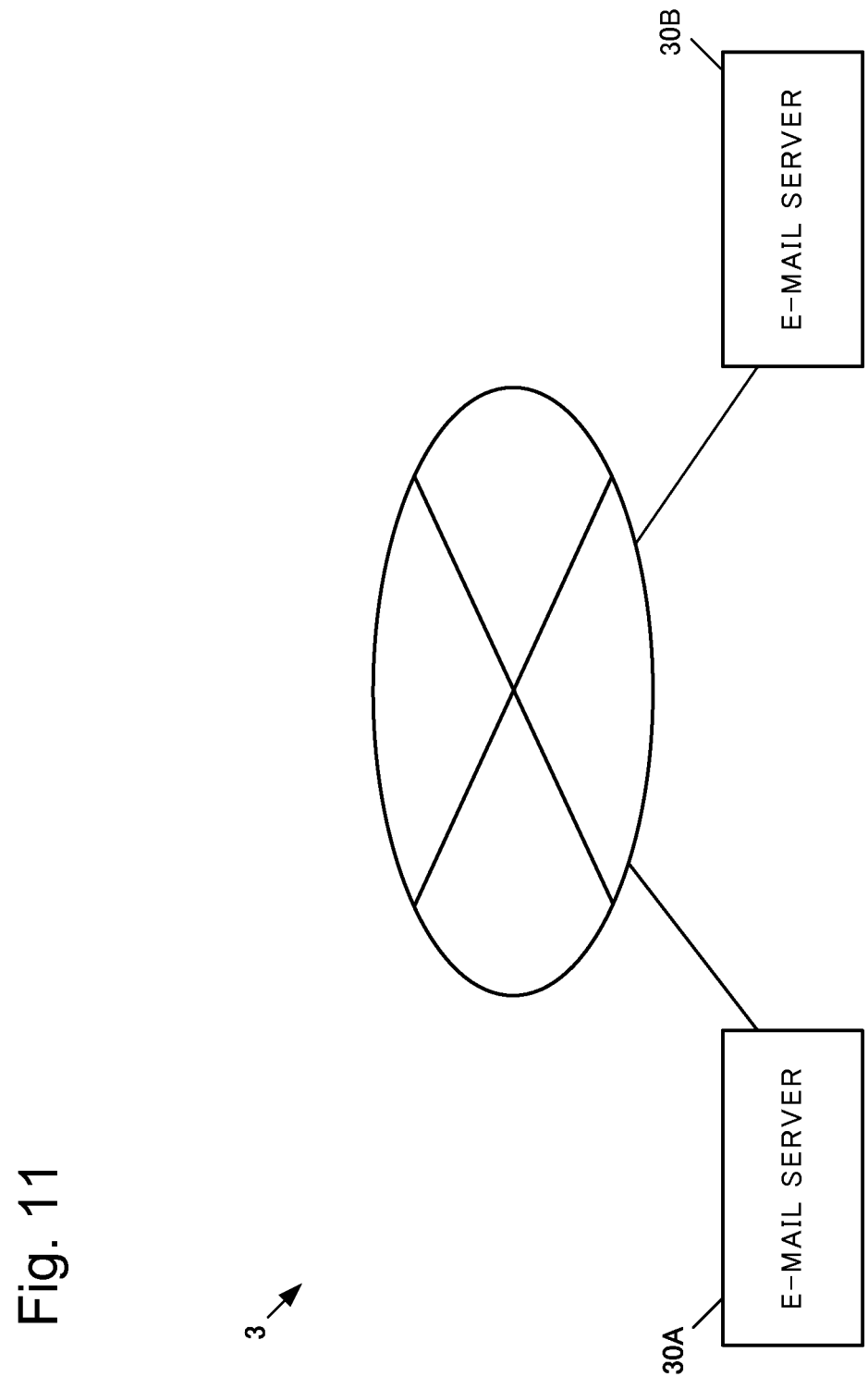
FIG. 11 is a block diagram illustrating an example of the configuration of a backup system according to a third exemplary embodiment of the present invention.

First, a configuration of a backup system 3 as the third exemplary embodiment according to the present invention is illustrated in FIG. 11. In FIG. 11, the backup system 3 includes e-mail servers 30A and 30B. Hereinafter, each the e-mail servers 30A and 30B will be also collectively referred to as an e-mail server 30. The e-mail servers 30 are mutually communicably connected to each other via a network, such as the internet, a LAN, a public line network, a wireless communication network or a network resulting from combining any two or more of these networks and the like. In addition, although the number of the e-mail server 30 illustrated in FIG. 11 is two, the number of the e-mail servers included in the backup system 3 according to this third exemplary embodiment of the present invention is not limited to this.

Figure 12:
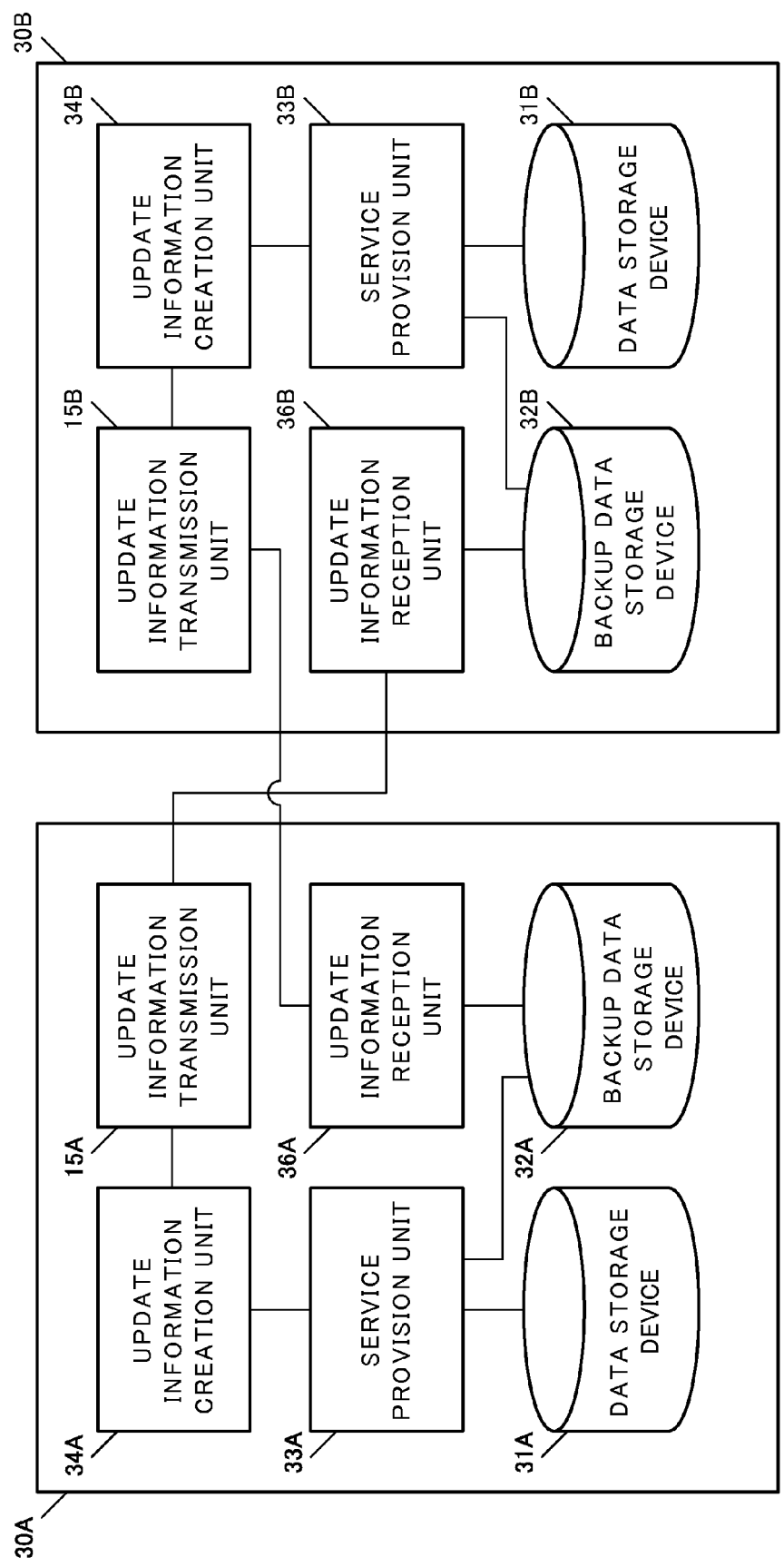
FIG. 12 is a functional block diagram illustrating an example of the functional configuration of an e-mail server in the backup system according to the third exemplary embodiment of the present invention.

Next, an example of the functional configuration of the e-mail server 30 is illustrated in FIG. 12. In FIG. 12, the e-mail server 30 is different from the e-mail server 20 as the second exemplary embodiment according to the present invention in that the e-mail server 30 includes a data storage device 31 as substitute for the data storage device 21, a backup data storage device 32 as substitute for the backup data storage device 22, a service provision unit 33 as substitute for the service provision unit 23, an update information creation unit 34 as substitute for the update information creation unit 24, and an update information reception unit 36 as substitute for the update information reception unit 26.

Here, a hardware configuration constituting the e-mail server 30 and the individual function blocks thereof can be realized by the same hardware configuration as that constituting the server 10 and the individual function blocks thereof, according to the first exemplary embodiment of the present invention and having been described with reference to FIG. 3. In addition, the hardware configuration constituting the e-mail server 30 and the individual function blocks thereof is not limited to the aforementioned configuration.

Next, details of each of the function blocks of the e-mail server 30 will be described.

The data storage device 31 of each of the e-mail servers 30 stores therein mail data for use in e-mail service provided by the each of the e-mail servers 30. Specifically, the data storage device 31 stores mail data in one or more mailboxes which are associated with each of user accounts. The one or more mailboxes which are associated with each of user accounts are created and managed by the service provision unit 33 which will be described below.

The backup data storage device 32 of each of the e-mail servers 30 stores therein backup data for the mail data stored in the data storage device 31 of the other one of the e-mail servers 30. Here, in the data storage device 31 of the other one of the e-mail servers 30, pieces of mail data are stored in one or more mailboxes associated with each of user accounts registered in the other one of the e-mail servers 30.

Thus, as a result, the backup data storage device 32 of the each e-mail server 30 is provided therein with one or more mailboxes for each of user accounts registered in the other e-mail server 30, and stores backup data for the mail data stored in the other e-mail server 30 in these mailboxes.

That is, in this exemplary embodiment, the backup data storage device 32A stores therein backup data for mail data having been stored in the data storage device 31B of the e-mail server 30B. Further, the backup data storage device 32B stores therein backup data for mail data having been stored in the data storage device 31A of the e-mail server 30A.

The service provision unit 33 provides e-mail service by using the mail data stored in the data storage device 31, just like the service provision unit 23 in the second exemplary embodiment according to the present invention. Further, in response to a request from a client terminal utilizing e-mail service provided by the other e-mail server 30, the service provision unit 33 presents backup data stored in the backup data storage device 32 under a mailbox in a read-only mode.

For example, the service provision unit 33 may provide mail transfer service based on the SMTP, just like the service provision unit 23 according to the second exemplary embodiment of the present invention. In this case, the service provision unit 33 of each of the e-mail servers 30 writes mails, which are sent to user accounts registered in the each of the e-mail servers 30, into the data storage device 31, among mails having been received from external e-mail servers or client terminals, just like the service provision unit 23 in the second exemplary embodiment according to the present invention.

Further, for example, the service provision unit 33 may provide mail acquisition service based on the Internet message access protocol (IMAP). In this case, in response to reception of an IMAP command from a client terminal, the service provision unit 33 carries out mail operation processing or mailbox management processing inside the data storage device 31. The mail operation processing includes an addition process, a deletion process, an acquisition process, a replication process, a movement process and the like with respect to mail data inside a relevant mailbox. Among these, the addition process, the deletion process, the replication process, the movement process and the like with respect to mail data are processes each involving updating the content of the data storage device 31. Further, the mailbox management processing includes an acquisition process, an addition process, a renaming process, a deletion process and the like with respect to a mailbox. Among these, the addition process, the rename process, the deletion process and the like are processes each involving updating the content of the data storage device 31. For example, the service provision unit 33 newly adds a mailbox to a relevant user account in response to reception of a CREATE command. Further, for example, the service provision unit 33 renames a relevant mailbox in response to reception of a RENAME command. Further, for example, the service provision unit 33 deletes a relevant mailbox in response to reception of a DELETE command.

Further, when having received an IMAP command from a client terminal utilizing e-mail service provided by the other one of the e-mail servers 30, the service provision unit 33 presents mailboxes of the backup data storage device 32 under a mailbox in a read-only mode. That is, with respect to the mailboxes under a mailbox in a read-only mode, the service provision unit 33 operates so as not to accept any IMAP command which requests mail operation processing involving an update process, as well as any IMAP command which requests mailbox management processing involving an update process.

When the mail data stored in the data storage device 31 has been updated, the update information creation unit 34 creates update information.

For example, when a piece of mail data has been added into the data storage device 31 by the service provision unit 33, the update information creation unit 34 creates update information representing this mail addition. The update information representing a mail addition may be information including a piece of information representing that a relevant updating process is a mail addition process, as well as pieces of information each representing a corresponding one of a relevant user account; a relevant mail box; a UID; and a mail body. In addition, cases where mail data is added into the data storage device 31 include a case where the service provision unit 33 has received a mail from an outside object by means of the SMTP, and a case where a mail addition has been directed from a client terminal by means of the IMAP, and the like.

Further, for example, when mail operation processing involving an update process has been carried out on mail data stored in the data storage device 31, the update information creation unit 34 creates update information representing this mail operation. The update information representing a mail operation may include pieces of information each representing a corresponding one of the content of the mail operation; a relevant user account; a relevant mailbox; a UID of a mail targeted for the mail operation; and a movement destination or a replication destination (in the case of movement or replication). In addition, cases where mail operation processing is carried out on mail data in the data storage device 31 include a case where the service provision unit 33 has received an IMAP command from a client terminal, and the like.

Further, for example, when mailbox management processing involving an update process has been carried out on the data storage device 31, the update information creation unit 34 creates update information representing the content of this mailbox management. The update information representing the content of mailbox management may include pieces of information each representing a corresponding one of the content of the management processing; a relevant user account; a relevant mailbox; and a new name of an existing mailbox (in the case of renaming an existing mailbox) or a name of a new mailbox (in the case of adding a mailbox). In addition, cases where mailbox management processing is carried out in the data storage device 31 include a case where the service provision unit 33 has received an IMAP command from a client terminal, and the like.

The update information reception unit 36 of each of the e-mail servers 30 receives update information from the other one of the e-mail servers 30, and reflects the update information in the backup data storage device 32.

For example, when having received update information representing a mail addition, in the backup data storage device 32, the update information reception unit 36 specifies a mailbox which is indicated by the update information among mailboxes associated with a user account indicated by the update information. Further, the update information reception unit 36 adds mail data whose content is included in the update information into the specified mailbox, simultaneously with associating the mail data with an UID indicated by the update information.

Further, when having received update information representing a mail operation, in the backup data storage device 32, the update information reception unit 36 specifies a mailbox which is indicated by the update information among mailboxes associated with a user account indicated by the update information. Further, in the specified mailbox, the update information reception unit 36 carries out mail operation processing indicated by the update information on a mail associated with a UID indicated by the update information.

Further, when having received update information representing the content of mail box management, in the backup data storage device 32, the update information reception unit 36 specifies a user account indicated by the update information. Further, in the specified user account, the update information reception unit 36 carries out mailbox management processing indicated by the update information.

Hereinafter, operation of the backup system 3 configured in such a way as described above will be described with reference to some of the drawings.

Figure 13:
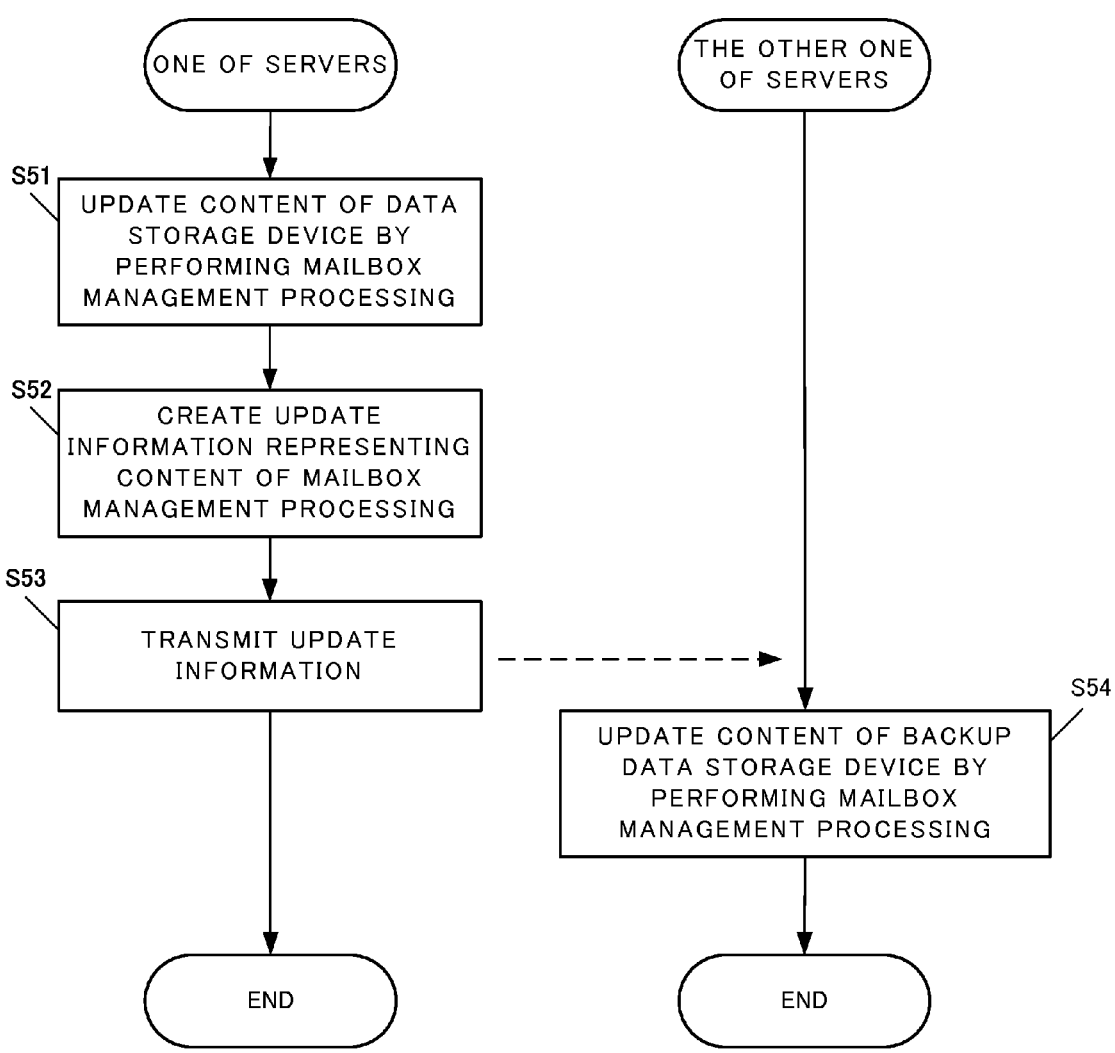
FIG. 13 is a flowchart illustrating an example of backup operation when mailbox management processing is carried out, in the backup system according to the third exemplary embodiment of the present invention.

First, backup operation of the backup system 3 when mailbox management processing involving an update process has been carried out in the e-mail server 30A is illustrated in FIG. 13. In addition, in FIG. 13, a left-hand portion illustrates operation of the server 30A; while a right-hand portion illustrates operation of the server 30B, and a dashed line having an arrow and connecting between the left-hand portion and the right-hand portion illustrates a flow of data.

As shown in FIG. 13, first, in the e-mail server 30A, the service provision unit 33A carries out mailbox management processing involving an update process in a relevant user account registered in the data storage device 31A on the basis of a request from a client terminal (Step S51).

Next, the update information creation unit 34A creates update information representing the content of the mailbox management (Step S52). For example, as described above, the update information creation unit 34A may create update information including pieces of information each representing a corresponding one of the content of the management processing, a relevant user account, a relevant mailbox, and a mailbox name (in the case of creating a new mailbox or renaming an existing mailbox).

Next, the update information transmission unit 15A transmits the update information having been created in Step S52 to the e-mail server 30B (Step S53).

Next, in the e-mail server 30B, the update information reception unit 36B receives the update information having been transmitted from the e-mail server 30A, and carries out mailbox management processing indicated by the received update information on the backup data storage device 32B (Step S54).

With the above operation, the backup system 3 terminates the backup operation when the mailbox management processing involving an update process has been carried out in the e-mail server 30A.

In addition, since two kinds of backup operation performed by the backup system 3, a first one being backup operation at the time when mail data has been newly received in the e-mail server 30A, a second one being backup operation at the time when a mail operation involving an update process has been carried out in the e-mail server 30A, are the same as the two kinds of backup operation, according to the second exemplary embodiment of the present invention and having been described with reference to FIG. 8 and FIG. 9, detailed description thereof is omitted in this exemplary embodiment. In this regard, nevertheless, in Step S21 of FIG. 8, the backup system 3 is different from the backup system in the second exemplary embodiment according to the present invention in that, besides the mail addition process based on the SMTP, a mail addition process based on the IMAP is also performed. Further, in Step S31 of FIG. 9, the backup system 3 is different from the backup system in the second exemplary embodiment according to the present invention in that a mail operation is carried out on the basis of the IMAP.

Figure 14:
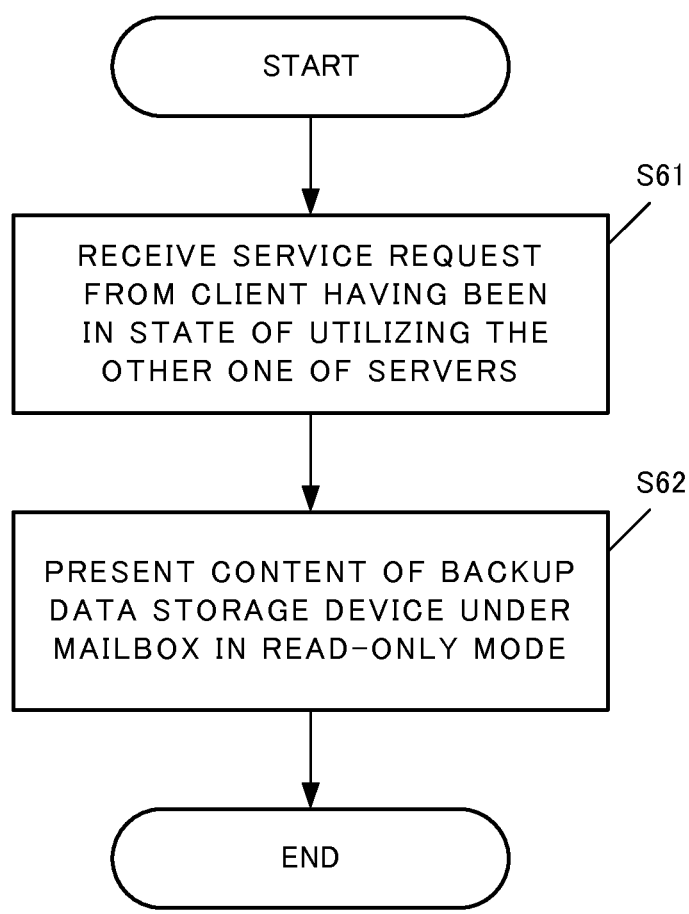
FIG. 14 is a flowchart illustrating an example of service continuation operation in the backup system according to the third exemplary embodiment of the present invention.

Next, service continuation operation of the backup system 3 when service provided by the e-mail server 30A has been suspended is illustrated in FIG. 14. For example, the e-mail server 30A suspends service provision when a fault has occurred in the e-mail server 30A, or when the service provision needs to be temporarily suspended because of maintenance of the e-mail server 30A or the like.

At this time, it is supposed that, in each of client terminals utilizing the e-mail server 30A, a service request destination is switched so that its service request can be made to the e-mail server 30B as substitute for the e-mail server 30A. Various publicly known technologies can be applied to the switching of the request destination, just like in the case of the switching of the request destination in the first exemplary embodiment according to the present invention.

In FIG. 14, first, in the e-mail server 30B, the service provision unit 33B receives a service request from a client terminal which has been in a state of utilizing e-mail service provided by the e-mail server 30A until then (Step S61). For example, the service provision unit 33B receives an IMAP command from such a client terminal. In addition, the service provision unit 33B may store therein user accounts managed by the e-mail server 30A in advance as user accounts for backup data. Further, the service provision unit 33B may receive a request for authentication before using such a user account for backup data, and may provide service after having been authenticated.

Next, the service provision unit 33B presents backup data stored in the backup data storage device 32B to a client terminal, which is the request originator in Step S61, in a read-only mode (Step S62). Specifically, the service provision unit 33B may present mailboxes, which are included in the backup data storage device 32B and which are associated with a relevant user account, to the client terminal under a mailbox in a read-only mode.

Figure 15:
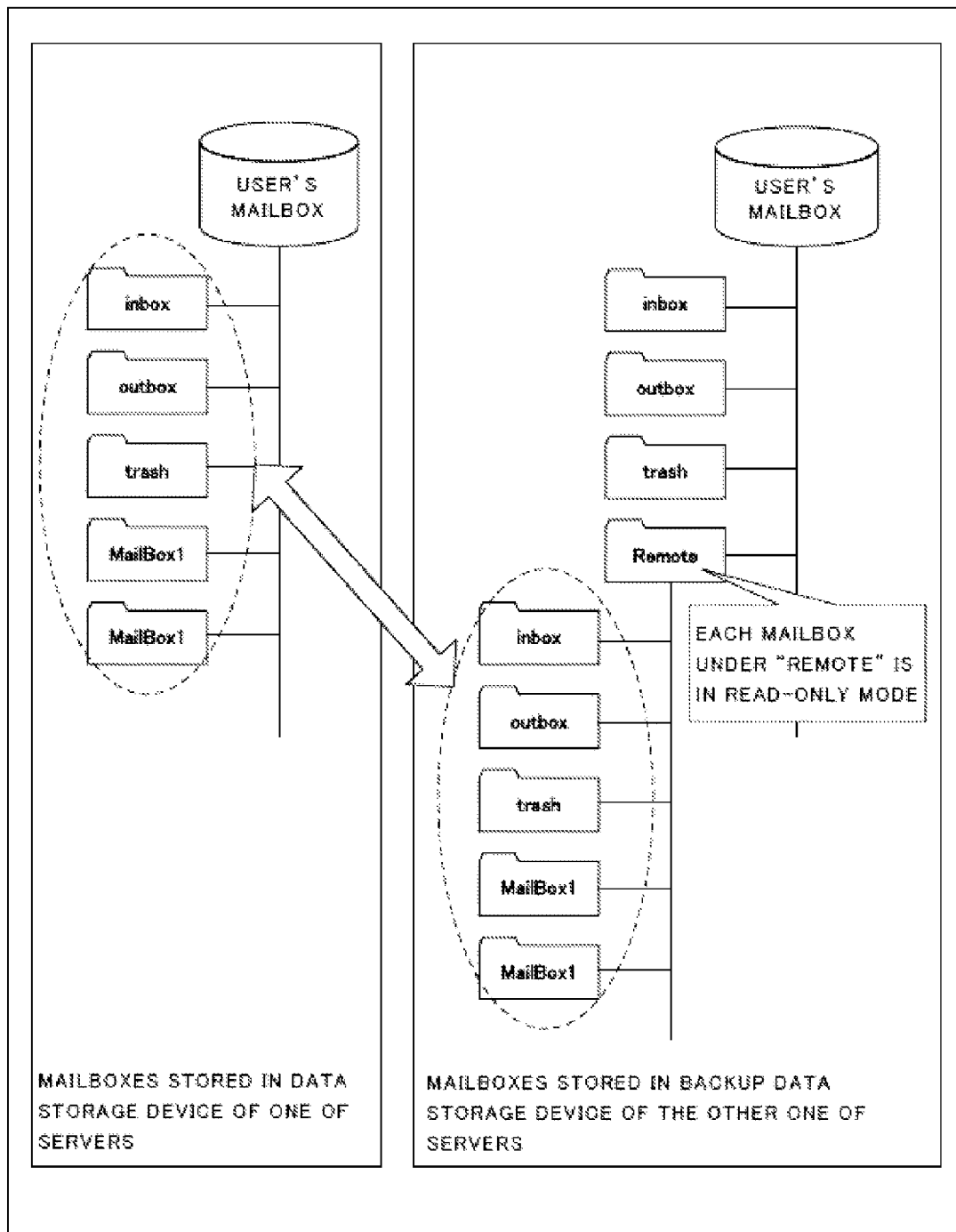
FIG. 15 is a schematic diagram illustrating a user's mailboxes stored in a data storage device of one of e-mail servers, and the user's mailboxes stored in a backup data storage device of the other one of the e-mail servers.

For example, an example of backup data presented to the client terminal in Step S62 will be described by using FIG. 15. FIG. 15 is a schematic diagram illustrating a user's mailboxes included in the data storage device of the e-mail server 30A and the above user's mailboxes included in the backup data storage device of the e-mail server 30B. In FIG. 15, two portions each being enclosed by a dashed line and a bidirectional arrow connecting the two portions indicate that pieces of mail data included in the respective two portions correspond to each other.

It is supposed that, when service provision by the e-mail server 30A is in a suspension state, the e-mail server 30B has received a service request from a client terminal which had been in a state of utilizing the e-mail server 30A before the suspension of the service provision by the e-mail server 30A. In this case, as shown in the right-hand portion of FIG. 15, the service provision unit 33B presents mailboxes included in the backup data storage device 32B under a mailbox "Remote" in a read-only mode. Here, the service provision unit 33B operates so as not to accept any IMAP command which requests mail operation processing involving an update process as well as any IMAP command which requests mailbox management processing involving an update process.

The above is the description of the service continuation operation of the backup system 3.

In addition, in the above-described some kinds of operation of the backup system 3, the e-mail server 30A and the function blocks thereof may be deemed as the e-mail server 30B and the function blocks thereof, respectively, and the e-mail server 30B and the function blocks thereof may be deemed as the e-mail server 30A and the function blocks thereof, respectively. In this way, operation of backing up data stored in the e-mail server 30B into the server 30A as well as continuation operation at the time of suspension of service provided by the server 30B can be similarly described.

Next, advantageous effects of the third exemplary embodiment according to the present invention will be described.

The backup system as the third exemplary embodiment according to the present invention also makes it possible to, with respect to e-mail servers among servers, each of the e-mail servers providing e-mail service and being capable of managing mailboxes, allow one of the e-mail servers which backs up another one of the e-mail servers to operate independently of the another e-mail server, so that it is possible to further effectively leverage each of the e-mail servers.

A reason for this is that, when, in each of the data storage devices, mailbox management processing involving an update process has been carried out by the service provision unit, the update information creation unit creates update information representing the content of the mailbox management processing; the update information transmission unit transmits the created update information to another one of the e-mail servers; and the update information reception unit receives update information from the another one of the e-mail servers and reflects the content of mailbox management processing in the backup data storage device.

In addition, in each of the aforementioned second and third exemplary embodiments according to the present invention, it has been described that the service provision unit provides mail acquisition service on the basis of any one of the POP and the IMAP, but the service provision unit in each of the exemplary embodiments may conform to both of the POP and the IMAP. Further, the service provision unit may provide e-mail service on the basis of, not only the SMTP, the POP and the IMAP, but also other protocols.

Further, in each of the aforementioned second and third exemplary embodiments according to the present invention, an example, in which an e-mail server is given as the server according to the first aspect of the present invention, has been described, but the aforementioned second and third exemplary embodiments can be also applied to servers each providing service different from the e-mail service.

Further, in each of the aforementioned exemplary embodiments according to the present invention, an example, in which the update information creation unit creates and accumulates a piece of update information, and when the piece of update information has been accumulated, the update information transmission unit serially transmits the accumulated pieces of update information, has been mainly described. Besides, the update information transmission unit of each of the exemplary embodiments may transmit the update information at different timing. For example, in a server in which the frequency of updating the data storage device is small, the update information transmission unit may transmit the accumulated pieces of update information at predetermined timing points, such as predetermined clock times.

Further, in each of the aforementioned exemplary embodiments according to the present invention, a case in which each of two servers operates as a backup server for the other one of the two servers has been mainly described. Besides, the backup system of each of the exemplary embodiments may include three or more servers. For example, in the case where the backup system includes three servers, the backup system may be configured such that the backup data storage device of a first server stores therein backup data for a second server, the backup data storage device of the second server stores therein backup data for a third server, and the backup data storage device of the third server stores therein backup data for the first server. As described above, the backup system is sufficient, provided that the backup data storage device of each of servers stores therein backup data for the data storage device of any other one of the servers, that is, backup data for the data storage device of each of the servers is stored in the backup data storage device of any other one of the servers.

Further, in each of the aforementioned exemplary embodiments according to the present invention, configuration may be made such that processes performed by a server, which have been described with reference to the individual flowcharts, are stored in advance in a storage device (a storage medium) of a computer apparatus as a computer program, and a relevant CPU reads out and executes the computer program. Further, in this case, an aspect of the present invention is directed to codes of the computer program or a storage medium for the computer program.

Further, the aforementioned exemplary embodiments can be also practiced by being appropriately combined with one another.

Further, the present invention is not limited to the aforementioned exemplary embodiments, and can be practiced in various forms and configurations.

The whole or part of the exemplary embodiments disclosed above can be described as, but not limited to, the following supplementary notes.

(Supplementary Note 1)

A server including: a first data storage device that stores therein data for use in service provided by the server; a backup data storage device that stores therein backup data for data stored in a second data storage device included in another server; a service provision unit that provides the service by using the data stored in the first data storage device, and in response to a request from a client terminal utilizing service provided by the another server, provides the client terminal with the service by using the backup data stored in the backup data storage device; an update information creation unit that, when a content of the first data storage device is updated by the service provision unit, creates update information representing a content of the updating having been performed on the content of the first data storage device; an update information transmission unit that transmits the created update information to the another server; and an update information reception unit that receives update information which is transmitted from the another server and which represents a content of updating having been performed on a content of the second data storage device, and reflects the content of the updating having been performed on the content of the second data storage device on the backup data stored in the backup data storage device on the basis of the received update information.

(Supplementary Note 2)

The server according to supplementary note 1, wherein, when providing the client terminal with the service by using the backup data stored in the backup data storage device, the service provision unit causes the backup data to be in a read-only mode.

(Supplementary Note 3)

The server according to supplementary note 1 or supplementary note 2, wherein, in the case where the service is an e-mail service, the first data storage device stores mail data therein; the backup data storage device stores therein backup data for mail data for use in the e-mail service provided by the another server; the service provision unit provides the e-mail service by using the data stored in the first data storage device, and, in response to a request from a client terminal utilizing the e-mail service provided by the another server, provides the client terminal with the e-mail service by using the backup data stored in the backup data storage device.

(Supplementary Note 4)

The server according to any one of supplementary notes 1 to 3, wherein the update information creation unit creates and accumulates the update information, and the update information transmission unit detects the accumulation of the update information and serially transmits the accumulated update information.

(Supplementary Note 5)

A backup system including a plurality of the servers each according to any one of supplementary notes 1 to 4.

(Supplementary Note 6)

A backup method for a server including a first data storage device that stores therein data for use in service provided by the server, and a backup data storage device that stores therein backup data for a second data storage device of another server, the backup method including: providing service by using the data stored in the first data storage device; when a content of the first data storage device is updated in conjunction with the provision of the service, creating update information representing a content of the updating having been performed on the content of the first data storage device; transmitting the created update information to the another server; when receiving update information which is transmitted from the another server and which represents a content of updating having been performed on a content of the second data storage device, reflecting the content of the updating having been performed on the content of the second data storage device on the backup data stored in the backup data storage device on the basis of the received update information; and in response to a request from a client terminal utilizing service provided by the another server, providing the client terminal with the service by using the backup data stored in the backup data storage device.

(Supplementary Note 7)

The backup method according to supplementary note 6, wherein, when the service is provided to the client terminal by using the backup data stored in the backup data storage device, the backup data storage device is caused to be in a read-only mode.

(Supplementary Note 8)

A non-transitory computer readable storage device recording a computer program which causes a server including a first data storage device that stores therein data for use in service provided by the server, and a backup data storage device that stores therein backup data for a second data storage device of another server to carry out processing including: a service provision process of providing service by using the data stored in the first data storage device; an update information creation process of, when a content of the first data storage device is updated in conjunction with the provision of the service, creating update information representing a content of the updating having been performed on the content of the first data storage device; an update information transmission process of transmitting the created update information to the another server; an update information reception process of, when receiving update information which is transmitted from the another server and which represents a content of updating having been performed on a content of the second data storage device, reflecting the content of the updating having been performed on the content of the second data storage device on the backup data stored in the backup data storage device on the basis of the received update information; and a backup data provision process of, in response to a request from a client terminal utilizing service provided by the another server, providing the client terminal with the service by using the backup data stored in the backup data storage device.

(Supplementary Note 9)

The non-transitory computer readable storage device according to supplementary note 8, wherein, in the backup data provision process, when the service is provided to the client terminal by using the backup data stored in the backup data storage device, the backup data storage device is caused to be in a read-only mode.

(Supplementary Note 10)

A server including: a first data storage means for storing therein data for use in service provided by the server; a backup data storage means for storing therein backup data for data stored in a second data storage means included in another server; a service provision means for providing the service by using the data stored in the first data storage means, and in response to a request from a client terminal utilizing service provided by the another server, provides the client terminal with the service by using the backup data stored in the backup data storage means; an update information creation means, when a content of the first data storage means is updated by the service provision means, for creating update information representing a content of the updating having been performed on the content of the first data storage means; an update information transmission means for transmitting the created update information to the another server; and an update information reception means for receiving update information which is transmitted from the another server and which represents a content of updating having been performed on a content of the second data storage means, and reflects the content of the updating having been performed on the content of the second data storage means on the backup data stored in the backup data storage means on the basis of the received update information.

(Supplementary Note 11)

The server according to supplementary note 11, wherein, when providing the client terminal with the service by using the backup data stored in the backup data storage means, the service provision means causes the backup data to be in a read-only mode.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A server comprising:
a first data storage device that stores therein data for use in a service provided by the server;
a backup data storage device that stores therein backup data for data stored in a second data storage device included in another server, wherein the data stored in the second data storage device is data for use in a second service provided by the another server;
a service provision unit that provides the service provided by the server by using the data stored in the first data storage device, and in response to a request from a client terminal utilizing the service provided by the another server, provides the client terminal with the service provided by the another server by using the backup data stored in the backup data storage device;
an update information creation unit that, when a content of the first data storage device is updated by the service provision unit, creates update information representing a content of the updating having been performed on the content of the first data storage device;
an update information transmission unit that transmits the created update information to the another server; and
an update information reception unit that receives update information which is transmitted from the another server and which represents a content of updating having been performed on a content of the second data storage device, and reflects the content of the updating having been performed on the content of the second data storage device on the backup data stored in the backup data storage device on the basis of the received update information;
wherein, in a case of an e-mail service:
the first data storage device stores mail data therein;
the backup data storage device stores therein backup data for mail data for use in an e-mail service provided by the another server; and
the service provision unit provides the e-mail service by using the data stored in the first data storage device, and, in response to a request from a client terminal utilizing the e-mail service provided by the another server, provides the client terminal with the e-mail service provided by the another server by using the backup data stored in the backup data storage device.

2. The server according to claim 1, wherein, when providing the client terminal with the service provided by the another server by using the backup data stored in the backup data storage device, the service provision unit causes the backup data to be in a read-only mode.

3. The server according to claim 1, wherein the update information creation unit creates and accumulates the update information, and the update information transmission unit detects the accumulation of the update information and serially transmits the accumulated update information.

4. A backup system comprising a plurality of the servers each according to claim 1.

5. A backup method for a server including a first data storage device that stores therein data for use in a service provided by the server, and a backup data storage device that stores therein backup data for a second data storage device of another server, wherein the data stored in the second data storage device is data for use in a service provided by the another server, the backup method comprising:
providing the service provided by the server by using the data stored in the first data storage device;
when a content of the first data storage device is updated in conjunction with the provision of the service provided by the server, creating update information representing a content of the updating having been performed on the content of the first data storage device;
transmitting the created update information to the another server;
when receiving update information which is transmitted from the another server and which represents a content of updating having been performed on a content of the second data storage device, reflecting the content of the updating having been performed on the content of the second data storage device on the backup data stored in the backup data storage device on the basis of the received update information; and
in response to a request from a client terminal utilizing the service provided by the another server, providing the client terminal with the service provided by the another server by using the backup data stored in the backup data storage device;
wherein, in a case of an e-mail service, the method further comprises:
the first data storage device storing mail data therein;
the backup data storage device storing therein backup data for mail data for use in an e-mail service provided by the another server;
providing the e-mail service by using the data stored in the first data storage device, and,
in response to a request from a client terminal utilizing the e-mail service provided by the another server, providing the client terminal with the e-mail service provided by the another server by using the backup data stored in the backup data storage device.

6. The backup method according to claim 5, wherein, when the service provided by the another server is provided to the client terminal by using the backup data stored in the backup data storage device, the backup data storage device is caused to be in a read-only mode.

7. A server comprising:
a first data storage means for storing therein data for use in a service provided by the server;
a backup data storage means for storing therein backup data for data stored in a second data storage means included in another server, wherein the data stored in the second data storage device is for use in a second service provided by the another server;
a service provision means for providing the service provided by the server by using the data stored in the first data storage means, and in response to a request from a client terminal utilizing the service provided by the another server, provides the client terminal with the service provided by the another server by using the backup data stored in the backup data storage means;
an update information creation means, when a content of the first data storage means is updated by the service provision means, for creating update information representing a content of the updating having been performed on the content of the first data storage means;
an update information transmission means for transmitting the created update information to the another server; and
an update information reception means for receiving update information which is transmitted from the another server and which represents a content of updating having been performed on a content of the second data storage means, and reflects the content of the updating having been performed on the content of the second data storage means on the backup data stored in the backup data storage means on the basis of the received update information;

wherein, in a case of an e-mail service:

the first data storage means stores mail data therein;

the backup data storage means stores therein backup data for mail data for use in an e-mail service provided by the another server; and the service provision means provides the e-mail service by using the data stored in the first data storage device, and, in response to a request from a client terminal utilizing the e-mail service provided by the another server, provides the client terminal with the e-mail service provided by the another server by using the backup data stored in the backup data storage means.

8. The server according to claim 7, wherein, when providing the client terminal with the service provided by the another server by using the backup data stored in the backup data storage means, the service provision means causes the backup data to be in a read-only mode.

* * * * *